(12) United States Patent
Outes Carnero et al.

(10) Patent No.: US 11,863,474 B2
(45) Date of Patent: Jan. 2, 2024

(54) FRONTHAUL CONFIGURATION BASED ON FACILITATING CELL ALLOCATION TO BASEBAND UNITS AND HUBS OF A COMMUNICATIONS NETWORK

(71) Applicant: TELEFONAKTIEBOLAGET LM ERICSSON (PUBL), Stockholm (SE)

(72) Inventors: Jose Outes Carnero, Torremolinos (ES); Juan Antonio Garcia Fernandez, Málaga (ES); Rocio Acedo Hernandez, Torremolinos (ES); Ceron Maria Larrubia, Málaga (ES); Patricia Alba Garcia, Málaga (ES); Guillermo Molina Arribere, Malaga (ES); Namit Singh, McKinney, TX (US); Miroslav Budic, Murphy, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 17/277,200

(22) PCT Filed: Jan. 27, 2019

(86) PCT No.: PCT/IB2019/050652
§ 371 (c)(1),
(2) Date: Mar. 17, 2021

(87) PCT Pub. No.: WO2020/058772
PCT Pub. Date: Mar. 26, 2020

(65) Prior Publication Data
US 2021/0399854 A1 Dec. 23, 2021

Related U.S. Application Data

(60) Provisional application No. 62/743,860, filed on Oct. 10, 2018, provisional application No. 62/732,843, filed on Sep. 18, 2018.

(51) Int. Cl.
*H04W 72/0453* (2023.01)
*H04L 5/00* (2006.01)
*H04L 41/08* (2022.01)

(52) U.S. Cl.
CPC ............ *H04L 5/0046* (2013.01); *H04L 41/08* (2013.01); *H04W 72/0453* (2013.01)

(58) Field of Classification Search
CPC ... H04W 72/0453; H04L 5/0046; H04L 41/08
See application file for complete search history.

(56) References Cited

U.S. PATENT DOCUMENTS

| | | | |
|---|---|---|---|
| 9,954,591 B2 * | 4/2018 | Liang | H04B 7/0617 |
| 10,608,734 B2 * | 3/2020 | Barbieri | H04B 7/15507 |

(Continued)

OTHER PUBLICATIONS

Checko A. et al., "Cloud RAN for Mobile Networks—A Technology Overview," in IEEE Communications Surveys & Tutorials, doi: 10.1109/COMST.2014.2355255, vol. 17, No. 1, pp. 405-426, First quarter 2015, Sep. 12, 2014.

(Continued)

*Primary Examiner* — Chandrahas B Patel

(57) ABSTRACT

A system, method and non-transitory computer readable media for facilitating network connectivity in a split architecture fronthaul network (102) comprising a plurality of cells (118-1 to 118-5, 120-1 to 120-5) and one or more BBU hubs (108A, 108B), each hub comprising at least a BBU (110-N, 112-M). An example cell allocation process (400B, 500A) is configured to assign cells to the hubs sequentially, i.e., a hub must be completely full (e.g., with respect to certain predetermined capacity such as port utilization) before adding cells to any other hubs. Once a hub is full, the allocated cells are further assigned to the individual BBUs of the hub also sequentially (500B). An optimal cell allocation map (418) is thereby obtained, which may be used in (Continued)

(re)configuring the connectivity between the cells (118-1 to 118-5, 120-1 to 120-5) and the hubs/BBUs (110-N, 112-M).

15 Claims, 15 Drawing Sheets

(56) References Cited

U.S. PATENT DOCUMENTS

| | | | | |
|---|---|---|---|---|
| 10,666,501 | B2* | 5/2020 | Cui | H04L 41/0895 |
| 11,563,492 | B2* | 1/2023 | Stapleton | H04L 25/02 |
| 2017/0164215 | A1 | 6/2017 | Chen et al. | |
| 2018/0013597 | A1 | 1/2018 | Barbieri et al. | |
| 2018/0077587 | A1 | 3/2018 | Al-Fanek et al. | |

OTHER PUBLICATIONS

Ericsson White Paper, "Cloud RAN", Sep. 2015, 11 pages, URL: https://www.ericsson.com/assets/local/publications/white-papers/wp-cloud-ran.pdf.

Artiza Networks, "Cloud/Centralized Radio Access Network (C-RAN)", LTE Tutorials, retrieved on Sep. 6, 2018 at URL: http://www.artizanetworks.com/resources/tutorials/cran.html.

Radisys White Paper, "Evaluating Cloud RAN Implementation Scenarios", Jun. 2014 retrieved from URL: http://events.windriver.com/wrcd01/wrcm/2016/08/WP-evaluating-cloud-ran-implementation-scenarios.pdf.

C. Lam Eng et al., "Method for enabling community detection with constraints", Self-Learning LTE Elastic Radio Access Network Configuration Design, Sep. 21, 2017, retrieved Sep. 11, 2020 at URL: https://imachine.jp.ao.ericsson.se:8143/~echieng/eran_algo/elastic_ran_algorithm_PA2.html.

H. Holm, "Optical Assignment of Cells in C-RAN Deployments with Multiple BBU Pools", 2015 European Conference on Networks and Communications (EUCNC), IEEE, Jun. 29, 2015 (Jun. 29, 2015), pp. 205-209.

Artiza Networks, "Cloud/Centralized Radio Access Network (C-RAN)", LTE Tutorials, 4 pages, retrieved on Sep. 6, 2018 at URL: http://www.artizanetworks.com/resources/tutorials/cran.html.

Radisys White Paper, "Evaluating Cloud RAN Implementation Scenarios", 15 pages, Jun. 2014 retrieved from URL: http://events.windriver.com/wrcd01/wrcm/2016/08/WP-evaluating-cloud-ran-implementation-scenarios.pdf.

C. Lam Eng et al., "Method for enabling community detection with constraints", Self-Learning LTE Elastic Radio Access Network Configuration Design, 35 pages, Sep. 21, 2017, retrieved on Sep. 11, 2020 at URL: https://machine.jp.ao.ericsson.se:8143/~echieng/eran_algo/elastic_ran_algorithm_PA2.html.

* cited by examiner

FRONTHAUL CONFIGURATION BASED ON FACILITATING CELL ALLOCATION TO BASEBAND UNITS AND HUBS OF A COMMUNICATIONS NETWORK

PRIORITY AND CROSS-REFERENCE TO RELATED APPLICATION(S)

This application is a national stage of International Application No. PCT/IB2019/050652, filed Jan. 27, 2019, the entire disclosure of which is fully incorporated herein by reference.

This patent application claims priority based upon the following prior United States provisional patent application(s): (i) "SYSTEM, METHOD AND ASSOCIATED COMPUTER READABLE MEDIA FOR FACILITATING CELL ALLOCATION TO BASEBAND UNITS AND HUBS OF A COMMUNICATIONS NETWORK," Application No. 62/732,843, filed Sep. 18, 2018, in the name(s) of Jose Outes Carnero, et al.; and (ii) "SYSTEM, METHOD AND ASSOCIATED COMPUTER READABLE MEDIA FOR FACILITATING COORDINATION SET GENERATION WITH ELASTIC RAN IN A COMMUNICATIONS NETWORK," Application No. 62/743,860, filed Oct. 10, 2018, in the name(s) of Jose Outes Carnero, et al.; each of which is hereby incorporated by reference in its entirety.

TECHNICAL FIELD

The present disclosure generally relates to communication networks. More particularly, and not by way of any limitation, the present disclosure is directed to a system, method, apparatus and associated computer readable media for facilitating fronthaul configuration based on cell allocation to baseband units and hubs in a communications network environment.

BACKGROUND

Next-generation (5th generation or 5G) mobile networks are faced with the challenge of providing a quantum-change in capability due to the explosion of mobile device usage and the ever-increasing capabilities of the end-user devices. The requirements for 5G are also manifold, as it is envisaged that it will cater for high-bandwidth high-definition streaming and conferencing, to machine interconnectivity and data collection for the Internet-of-Things (IoT), and to ultra-low latency applications such as autonomous vehicles as well as augmented reality (AR), virtual reality (VR) or mixed reality (MR) applications, and the like. The evolution toward 5G mobile networks is also driven by the diverse requirements of a multitude of new use cases in the areas of enhanced mobile broadband (eMBB), ultra-reliable low-latency communication (URLLC) and massive machine-to-machine (M2M) communications, among others. Along with a demand for lower costs, these drivers have led to the development of split architectures for the radio access network (RAN) to support multiple deployment models.

Centralized-RAN or Coordinated-RAN (C-RAN) is a recently developed split network architecture for Long Term Evolution (LTE) networks where baseband resources are pooled and coordinated so that they can be shared between base stations. In this manner, this architecture simplifies and enhances the radio resource management in complex operating environments such as, e.g., heterogeneous networks including Carrier Aggregation (CA). The main functions of a base station are divided into baseband processing and radio frequency (RF) functionalities, wherein a centralized baseband processing module (referred to as a baseband unit (BBU) or Digital Unit (DU)) is responsible for communication through the physical interface, including coding and modulation among its main functions. On the other hand, the radio module (referred to as a remote radio unit (RRU) or remote radio head (RRH)) carries out frequency filtering and power amplification, and are configured to transmit and receive wireless signals, converting digital baseband signals into RF signals to be transmitted to the user equipment (UE) or converting RF signals into digital baseband signals for transmission to the BBU. In a heterogeneous network deploying low power nodes or small cells, a low power RRU is also known as a micro RRU or mRRU.

Network evolution, new LTE-Advanced features, radio coordination between cells and bands, more heterogeneous networks composed of multiple layers, mobile data traffic growth, and the imminent arrival of 5G are therefore demanding new approaches to the network architecture.

To realize additional benefits of a split architecture, several approaches such as inter-site baseband connectivity and BBU coordination are also being pursued in a network architecture referred to as Elastic RAN or E-RAN.

Whereas advances relative to C-RAN/E-RAN implementation in heterogeneous network environments continue to grow apace, several lacunae remain, thereby requiring further innovation as will be set forth hereinbelow.

SUMMARY

The present patent disclosure is broadly directed to systems, methods, apparatuses, devices, and associated non-transitory computer-readable media for facilitating optimized network connectivity based on improved cell allocation, better BBU coordination, or both, in a split architecture fronthaul network comprising a plurality of cells and one or more baseband unit (BBU) hubs, each hub comprising at least a BBU. In one aspect, an example cell allocation process is configured to assign cells to the hubs sequentially, i.e., a hub must be completely full (e.g., with respect to certain predetermined capacity parameters such as port utilization, hardware resources, etc.) before adding cells to any other hubs. Once a hub is full, the allocated cells are also sequentially assigned to the individual BBUs of the hub, i.e., a BBU must be full before any cells are assigned to a next BBU in the hub. An optimal cell allocation map is thereby obtained, which may be used in (re)configuring the connectivity between the cells and the hubs/BBUs.

In one embodiment, an example method includes, inter alia, providing a plurality of input variables and design constraints with respect to a fronthaul network portion comprising a plurality of cells (e.g., heterogeneous cells comprising macrocells, microcells, small cells, etc.) and one or more BBU hubs. The example method further includes selecting a BBU hub responsive to a determination with respect to at least one or more input variables and design constraints. Once a BBU hub is selected, at least a portion of the cells are allocated to the selected BBU hub until the selected BBU hub is determined to be full with respect to a capacity parameter. The allocated cells are then assigned to the individual BBUs sequentially within the selected BBU hub. The acts of selecting BBU hubs, allocating cells to each of the selected BBU hubs and allocating the allocated cells to individual BBUs within each selected BBU hub, respectively, may be repeated in a sequential iterative process until there remain no unallocated cells. Accordingly, a cell allocation map identifying allocations of the plurality of cells with respect to the selected BBU hubs and the individual BBUs therein of the fronthaul network is obtained. Responsive to the cell allocation map, connections between the plurality of cells and the selected BBU hubs may be configured so as to optimize one or more key performance indicators (KPIs) in the fronthaul network with respect to at least one of radio frequency (RF) capacity, network throughput, spectral efficiency, hardware optimization including per-BBU port utilization, application coverage, inter-cell interference, and user media experience, etc.

In a further aspect, an embodiment of the present disclosure is directed to a method of configuring BBUs based on optimal partnerships for leveraging E-RAN features such as Carrier Aggregation (CA) and Coordinated Multi-Point (CoMP) over a unified coordination area irrespective of the BBU deployment scenario. The claimed embodiment comprises, inter alia, providing a plurality of inputs and design constraints with respect to a fronthaul network comprising a plurality of cells and BBUs, which may be organized into one or more hubs. A BBU overlapping traffic data structure is generated based on per-BBU cell allocation data and cell overlapping data with respect to a particular E-RAN feature pertaining to the fronthaul network. A sorted list of candidate BBU partnerships is generated from the BBU overlapping traffic data. An iterative process is executed for sequentially selecting BBU partnerships from the sorted list to generate a coordination set (CS) of BBU partners for each BBU. Responsive thereto, appropriate control message communications are effectuated among the BBU partners for facilitating one or more KPIs in the fronthaul with respect to the particular E-RAN feature. In one variation, the coordination sets may be generated for each BBU hub and for each E-RAN feature. In another variation, inter-hub BBU partnerships may be determined based on applicable performance constraints and/or E-RAN features.

In a still further aspect, an embodiment of a system, apparatus, or computer platform is disclosed which comprises, inter alia, suitable hardware such as processors and persistent memory having program instructions for executing an embodiment of the methods set forth herein.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, workstation, server, and the like, mutatis mutandis. Further features of the various embodiments are as claimed in the dependent claims.

Advantages flowing from an embodiment of the present invention may include but not limited to maximizing the benefit of advanced C-RAN/E-RAN features while minimizing hardware resources (e.g., BBU hubs and BBUs), preferably under a set of user-defined design requirements. A sequential allocation approach set forth according to embodiments herein provide a parsimonious allocation of the hardware within a design optimization framework, thereby allowing minimization of hardware cost. In further aspects, example embodiments of the present invention are configured to determine optimal BBU partners for every BBU in the network to maximize the benefit of advanced E-RAN features, which may be conditioned on reciprocal or nonreciprocal relationships while satisfying per-BBU limitations on how many partners are allowed for each BBU.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
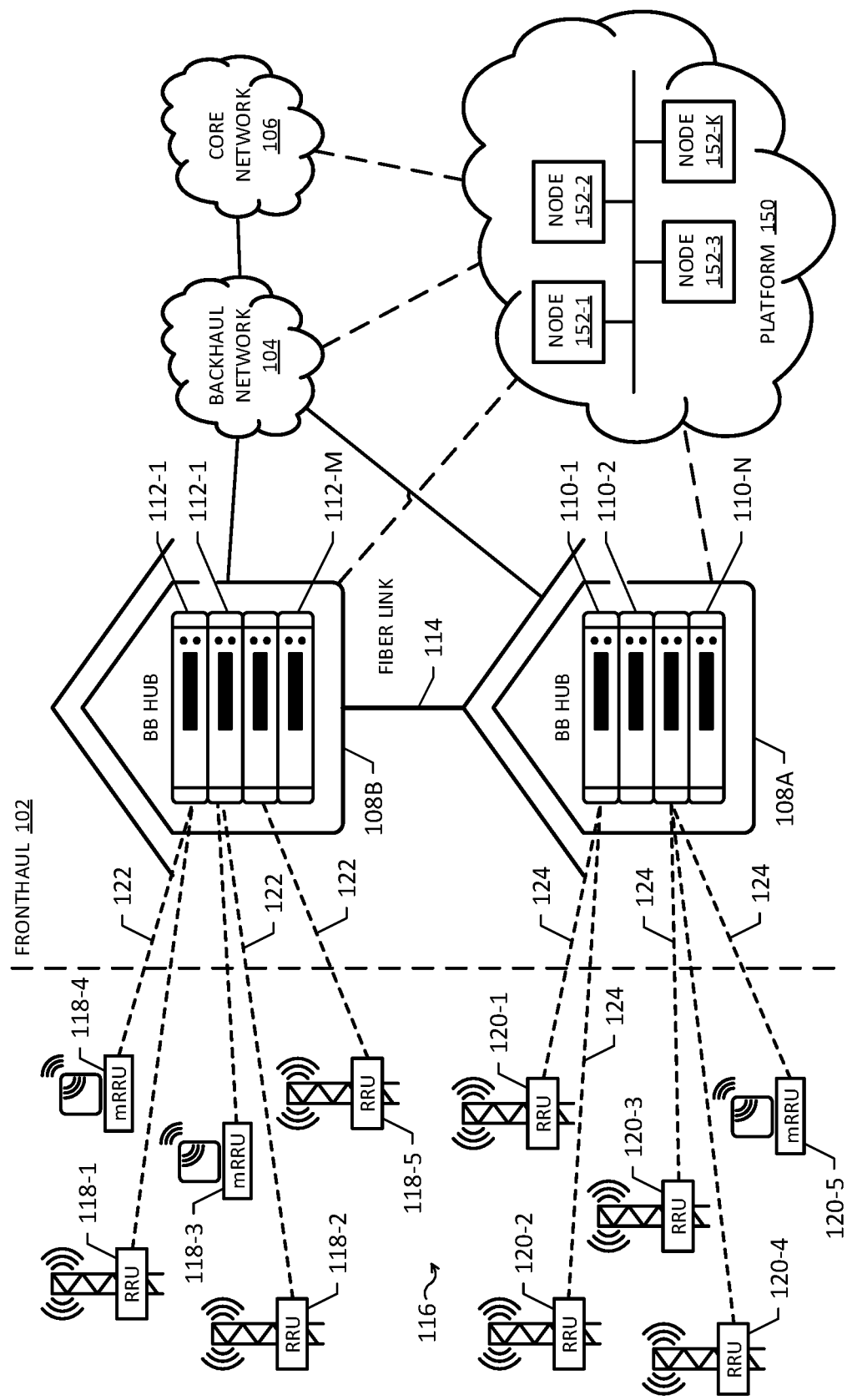
FIG. 1 depicts an example network environment including a fronthaul portion based on a split network architecture wherein one or more embodiments of the present patent disclosure may be practiced in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element, platform or node may be comprised of one or more pieces of service network equipment, including hardware and software that communicatively interconnects other equipment on a network (e.g., other network elements, end stations, etc.), and is adapted to host one or more applications or services with respect to a plurality of subscribers and associated client devices as well as other endpoints and IoT-based entities, each executing suitable client applications configured to consume various data/voice/media services as well as sense/collect various types of data, information, measurements, etc. As such, some network elements may be disposed in a cellular wireless or satellite telecommunications network, or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks and core networks in a hierarchical arrangement. In still further arrangements, one or more network elements may be disposed in cloud-based platforms or data centers having suitable equipment running virtualized functions or applications relative to one or more processes set forth hereinbelow.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment comprising split architectures as will be described in detail below. Accordingly, example UE devices may comprise smartphones, multimedia/video phones, mobile/wireless user equipment, portable media players, smart wearables such as smart watches, goggles, digital gloves, portable laptops, netbooks, palm tops, tablets, phablets, mobile phones, IoT devices and sensors, connected vehicles (manual and/or autonomous), and the like, as well as networked or local gaming devices/consoles including augmented reality (AR), virtual reality (VR) or mixed reality (MR) devices. In a further variation, some client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network environment 100 including a fronthaul portion 102 based on a split network architecture, e.g., Coordinated-RAN or Centralized-RAN (C-RAN) architecture (also referred to as Collaborative RAN), wherein one or more embodiments of the present patent disclosure may be practiced in accordance with the teachings herein. Broadly, the fronthaul portion 102 may be comprised of three main components: one or more BBUs that may be organized into groups of cooperating nodes (referred to as BBU pools, hubs or hotels), a plurality of macrocells, microcells, small cells, femtocells, picocells, etc. (collectively referred to as "cells" unless otherwise specified) comprising a dense, heterogeneous radio environment 116, and a suitable transport network. By way of illustration, a plurality of BBUs 110-1 to 110-N and 112-1 to 112-M may be organized into one or more BBU pools or hubs, e.g., BBU hubs 108A and 108B, which may be operative to serve various cells (i.e., via respective RRUs, mRRUs and the like) connected by means of respective in-phase, quadrature (I/Q) data communication links that may span several kilometers, each operating based on a suitable protocol such as, e.g., Common Public Radio Interface (CPRI), Open Base Station Architecture Initiative (OBSAI), or Open Radio equipment Interface (ORI) over optical fiber or microwave media. As exemplified, cells 118-1 to 118-5 are operative with BBU hub 108B via fronthaul links 122, while cells 120-1 to 120-5 are operative with BBU hub 108A via fronthaul links 124. In general, a BBU may be configured to serve one or more cells depending on cell allocation. In some embodiments, a low latency link 114 may be disposed between the BBU hubs 108A and 108B for facilitating inter-hub communication and coordination. By way of illustration, such a link 114 may be fiber-based, RF microwave link, Ethernet, etc., as long as it is configured to support/provide the required QoS. A backhaul network portion 104 is operative as an aggregation network for connecting the BBU pools 108A/108B to a core network portion 106, which may be based on a converged communications architecture, e.g., an Evolved Packet Core (EPC) architecture, that typically includes various components and elements such as one or more mobility management entities (MMEs), serving gateways (SGWs), packet data node (PDN) gateways (PGWs), policy/charging function nodes, etc., as is known in the art.

One or more computing platforms 150, which may be implemented as one or more standalone servers, data center nodes, and/or management nodes associated with a communications network or a portion thereof, generally shown as nodes 152-1 to 152-K, may be provided in accordance with the teachings herein for purposes of one or more classes of embodiments of the present disclosure with respect to effectuating several aspects relevant to a C-RAN-based fronthaul network architecture, e.g., optimal cell allocation to different BBUs, determining coordination sets of different BBUs according to optimal partnerships, etc., as will be set forth in detail further below. To provide a contextual framework in which example embodiments of the present disclosure may be better appreciated, a general discussion pertaining to C-RAN is provided immediately as follows.

One of the key aspects with respect to C-RAN from the point of view of centralization is the possibility of aggregating BBUs to form a BBU pool, as exemplified in FIG. 1, which may be configured to take the advantage of data center processing capabilities, potentially including Big Data analytics capabilities. In addition, BBU utilization between heavily loaded and lightly loaded base stations disposed in disparate service areas may be optimized. In other words, BBUs from many, potentially geographically dispersed, sites may be placed at a centralized location, and connected within a BB hub (or, simply, a hub), while the RRUs may be placed at distances up to several kilometers away and connected to the BBUs/hubs via suitable I/Q links, e.g., as illustrated in FIG. 1. Further, a BBU pool (e.g., BBU pools 108A/108B in FIG. 1) can utilize open platforms and real-time virtualization technology rooted in cloud computing to achieve dynamic shared resource allocation. Accordingly, it should be appreciated that BBU functionality and services in example network environment 100 may be moved to a virtual computing cloud to have a programmable architecture in additional embodiments. Further, in terms of coordination, C-RAN may be implemented as an advanced feature in certain Long Term Evolution (LTE) networks wherein cells may be grouped in clusters and connected to the same BBU to allow inter-cell coordination. Accordingly, improved coverage, spectral efficiency, system capacity and user experience, etc., may be advantageously achieved in example embodiments of the present disclosure by applying suitable design constraints with respect to cell allocation and/or optimal BBU coordination. Moreover, it will be appreciated that centralizing baseband processing and control of radio resources in a single entity facilitates implementing new technologies like integration of heterogeneous cells (e.g., low power nodes, small cells, macrocells, microcells, picocells, femtocells, etc.) and advanced features such as Carrier Aggregation (CA) much simpler and hence more manageable. As more frequencies are transmitted in the same geographical space, coordinated management of overlapping small cells and macrocells becomes essential, especially in a split fronthaul architecture depicted in FIG. 1.

In a CPRI-based fronthaul implementation, requirements for RRU-to-BBU latency typically impose a one-way 75 μs delay on the CPRI link, which translates into a maximum of 15 km between the RRUs (i.e., cell locations) and the BBU hub, assuming that the hub is populated with co-located or collocated BBUs. In a further arrangement, coordination among BBUs of the same BBU hub (i.e., intra-hub coordination) may also be achieved in certain embodiments. It is also possible to achieve coordination between BBU hubs located several kilometers away from each other, depending on latency requirements (i.e., inter-hub coordination). According to certain example embodiments of the present disclosure, such coordination among BBUs/BBU hubs may be implemented in an advanced feature set architecture referred to as Elastic-RAN (E-RAN), which may be configured to provide optimal partnerships among different BBUs across the entire network. Typically, maximum allowed BBU-to-BBU delay for E-RAN is 30 μs over E5 interface, which translates into a maximum separation of 5 km between BBU hubs in one implementation. As will be seen further below, accordingly, certain example embodiments are directed to optimizing capabilities such as Carrier Aggregation (CA) and Coordinated Multipoint (CoMP) over a unified coordination area irrespective of the BBU deployment scenario in the network by determining appropriate BBU partnerships and configuring BBU coordination sets in response thereto.

It will be appreciated that a key benefit of C-RAN is the ability to leverage coordination to improve overall RF performance in a network. Example performance features that take advantage of improved radio coordination between cells and bands in an example embodiment may be set forth as follows.

Handover or Mobility Management: Delay in performing inter-site handovers is reduced as it can be done inside the centralized unit instead of between base stations. Moreover, the general amount of signaling information sent to the core mobile network is reduced, after being aggregated in a single entity.

Load Balancing or Traffic Management: On the BB hub side, it can be seen that BBUs already form one logical entity; therefore load balancing is a matter of assigning proper BBU resources within a pool. On the RRU/cells side, users can be switched between cells without constraints if the BBU pool has capacity to support them, as capacity can be assigned dynamically from the pool.

Interference Management: Interference control techniques such as eICIC (enhanced Inter-Cell Interference Coordination) can benefit from the parallelized computational resources and increased processing power at the centralized BBU/hub.

Carrier Aggregation (CA): This feature provides the ability to aggregate multiple LTE carriers together in providing service to an end station or user equipment (UE). Prior to C-RAN adoption, the main restriction for the CA operation is that the UE can only aggregate Component Carriers (CCs) served by the same base station because CCs must be perfectly synchronized. Additionally, small cells are typically configured to operate rather independently as they have their own on-board reference clock, which can give rise to a significant probability of two neighboring cells drifting apart. With the adoption of the C-RAN architecture, all baseband resources and CCs are hosted by a single entity, so it is relatively easy to have a single reference clock for all aggregated CCs, which simplifies joint scheduling. Thus, CA is supported between all cells connected to the same BBU hub, i.e. with both C-RAN and E-RAN architectures, which is advantageously enhanced in example embodiments directed to optimal cell allocation (which optimizes assignment of cells to the same BBU under certain design constraints) as well as in example embodiments directed to determining optimal BBU partners for coordination.

Uplink Coordinated Multipoint Reception (UL CoMP in LTE-Advanced): The UL CoMP solution improves the quality, throughput and the capacity of the UL signal because the UE transmission is received via multiple cells that are geographically separated. Thus, the signal level is increased and the inter-cell interference (ICI) reduced by jointly processing these signals in a centralized platform.

Downlink Coordinated Multipoint Transmission (DL CoMP in LTE-Advanced): In an example arrangement where the fronthaul connectivity is based on a cell allocation scheme of the present disclosure, C-RAN may be configured to analyze the interference situation on the DL from all the cells in the coordinated cluster (which may be defined responsive to the cell allocation scheme) and, based on that information, the scheduler decisions may be optimized accordingly. In other words, a DL CoMP solution relies on turning inter-cell interference into a useful signal. This increases the Signal Interference plus Noise Ratio (SINR) at the UE, which in turn leads to higher achievable bit rates. This technique is particularly useful to improve the performance at the edges of the cells since the SINR values are generally lower.

Whereas one of the main challenges of C/E-RAN design is to find an optimal cell clustering and BB hub assignability with minimal overhead and maximum gain, example embodiments set forth below advantageously address such challenges by focusing on several performance goals and constraints within a computationally efficient process. By way of illustration, example embodiments may be based on, without limitation, one or more of the following: (i) cells should be optimally clustered to be assigned to one BB hub in order to achieve/maximize statistical multiplexing gain, facilitate CoMP and CA, but also prevent the BB hub and the fronthaul from overloading; (ii) a BB hub should support cells from different areas such as office, residential or commercial as well as cells of various types and kinds, such as small cells, macrocells or microcells, etc.; and (iii) intra-hub and inter-hub coordination among BBUs should be possible within the constraints such as latency, etc. Example embodiments may therefore consider constraints such as, e.g., the distance restrictions between RRUs and BBU/BB hub locations, BBU hardware/software resources, the number of available ports to connect various types of heterogeneous cells/nodes (e.g., macrocells, small cells, etc.), and having the possibility of cascading multiple small cells on the same port if they are collocated. Accordingly, in still further aspects, certain example embodiments are directed to optimizing a partner-BBU selection scheme in order to maximize the RF benefit of advanced E-RAN features such as, e.g., CA and CoMP.

It will therefore be appreciated that at least a class of example embodiments set forth herein facilitate a fronthaul network (re)configuration or (re)arrangement wherein cells on the same BBU benefit from C-RAN advanced features, whereas cells on the same hub benefit from E-RAN advanced features, as far as they belong to the same coordination set or, in other words, they belong to partner BBUs. In certain example embodiments, a BBU can have up to a configurable number of partner BBUs, (e.g., six), with or without the restriction of BBU partnerships being reciprocal.

Figure 2:
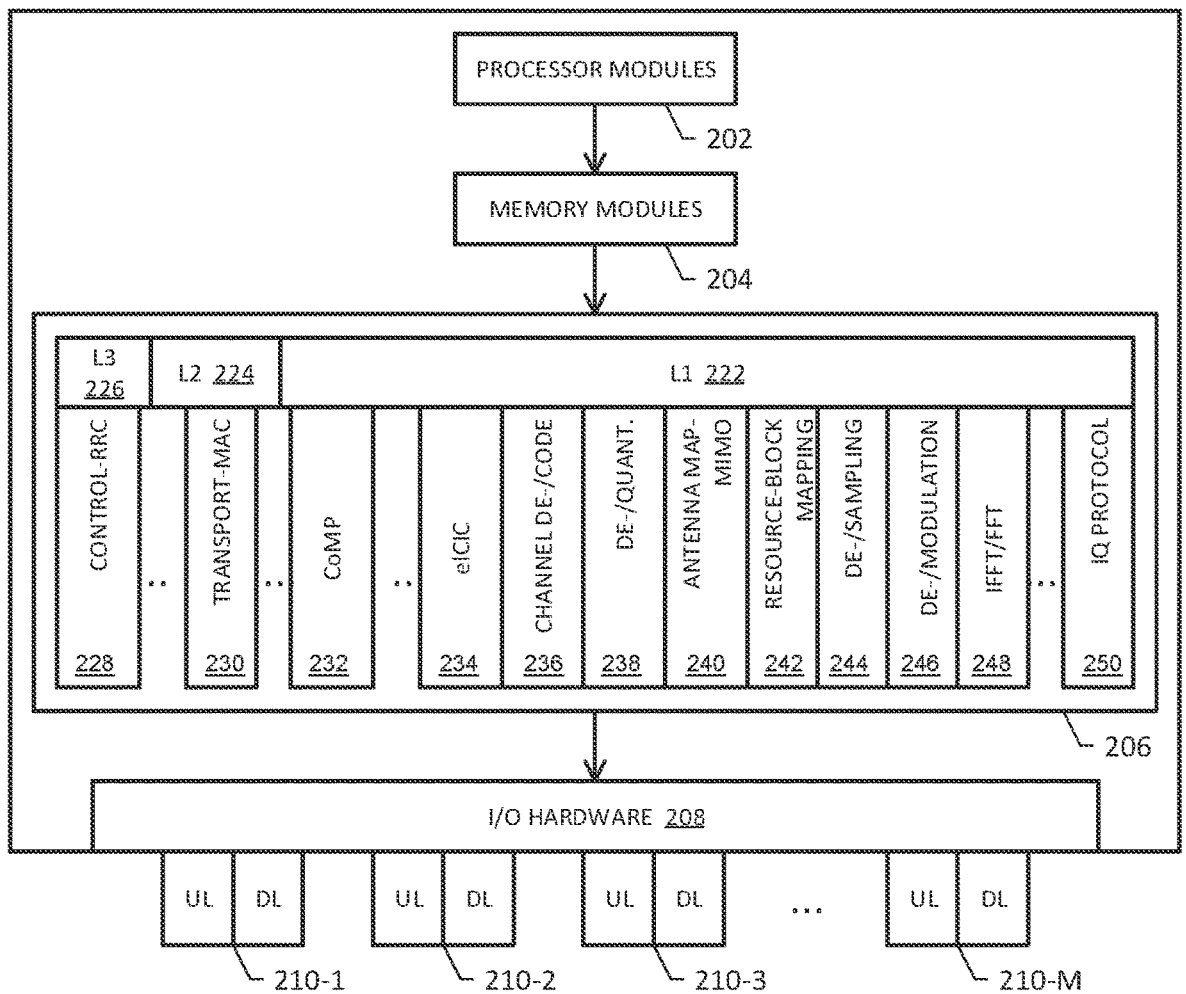
FIGS. 2 and 3 depict an example baseband unit (BBU) and an example remote radio unit (RRU), respectively, each being representative of one or more BBUs and one or more RRUs that may be disposed in a fronthaul network portion for purposes an embodiment of the present patent disclosure.
Figure 3:
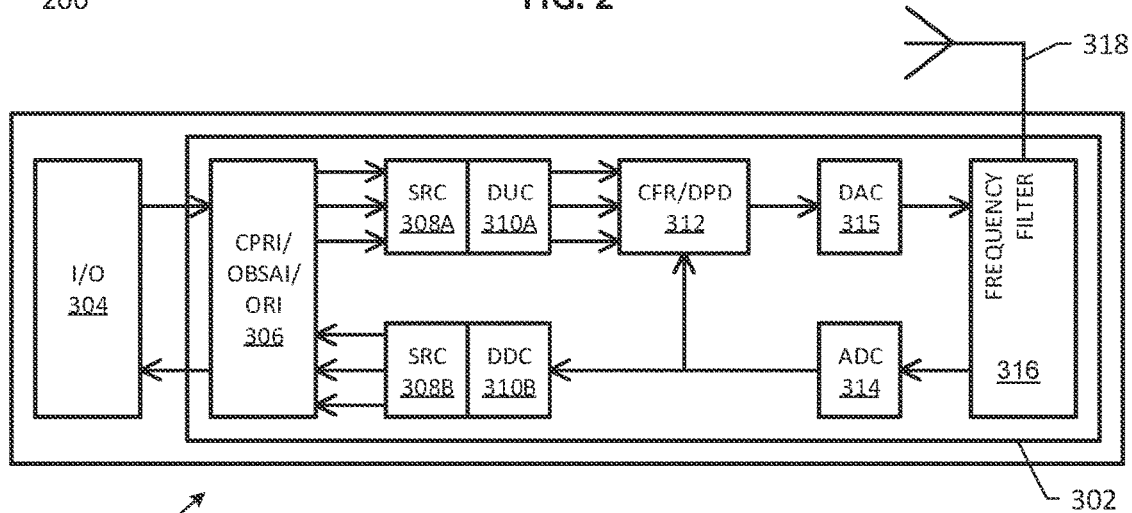

Additional details with respect to an example BBU 200 and an example RRU 300 are illustrated in FIGS. 2 and 3, respectively, each being representative of one or more BBUs and one or more RRUs that may be disposed in a fronthaul network portion (e.g., the fronthaul network portion 102 shown in FIG. 1) for purposes an embodiment of the present patent disclosure. BBU 200 may include one or more processor modules 202 and one or more memory modules 204 for effectuating various baseband processing functionalities 206 that may be organized under L1-L3 layer functional blocks 222, 224, 226, generally relating to coding, modulation, Fast Fourier Transform (FFT), etc. As illustrated, Radio Resource Control (RRC) functionality 228 and Media Access Control (MAC) functionality 230 are exemplified as L3 and L2 layer blocks, respectively. L1 layer functional block 222 is exemplified with several modules including CoMP module 232, eICIC module 234, channel coding/decoding module 236, quantization/de-quantization module 238, multi-input-multi-output (MIMO) antenna mapping module 240, resource block mapping module 242, sampling/de-sampling module 244, modulation/demodulation module 246, FFT/Inverse FFT (IFFT) module 248 as well as IQ protocol module 250. An input/output (I/O) module 208 is operative to support a plurality of fronthaul ports 210-1 to 210-M for effectuating suitable IQ links (e.g., based on CPRI, OBSAI or ORI) with a plurality of RRUs, wherein each port may be configured to support uplink (UL) and/or downlink (DL) communications in an example arrangement. Although not specifically shown in FIG. 2, a CS database populated with suitable BBU partnership data may be included in a BBU (e.g., per hub). Additionally, one or more backhaul interfaces may also be provided as part of BBU 200 for effectuating connectivity with an aggregation network.

Example RRU 300 is broadly concerned with providing an interface between the IQ fiber link and radio connectivity to one or more UEs (not shown in this FIG.), and is generally responsible for digital processing, frequency filtering and power amplification, etc., generally illustrated as an assembly of modules 302. An antenna 318 is operatively coupled to a frequency filter and power amplification module 316, which is coupled to an analog-to-digital converter (ADC) 314 and a digital-to-analog converter (DAC) 315 for uplink and downlink communications, respectively. ADC 314 and DAC 315 are coupled to a crest factor reduction (CFR) and digital predistortion (DPD) module 312 as well as respective sampling rate conversion (SRC) and digital up/down conversion (DUC)/DDC) modules, as exemplified by SRC 308A/B, DDC 310B and DUC 310A. An IQ protocol module 306 is operatively coupled to one or more I/O modules 304 to effectuate IQ communications via suitable IQ links to one or more BBUs depending on cell allocation, e.g., during dynamic or static (re)configuration of a fronthaul network portion.

Figure 4A:
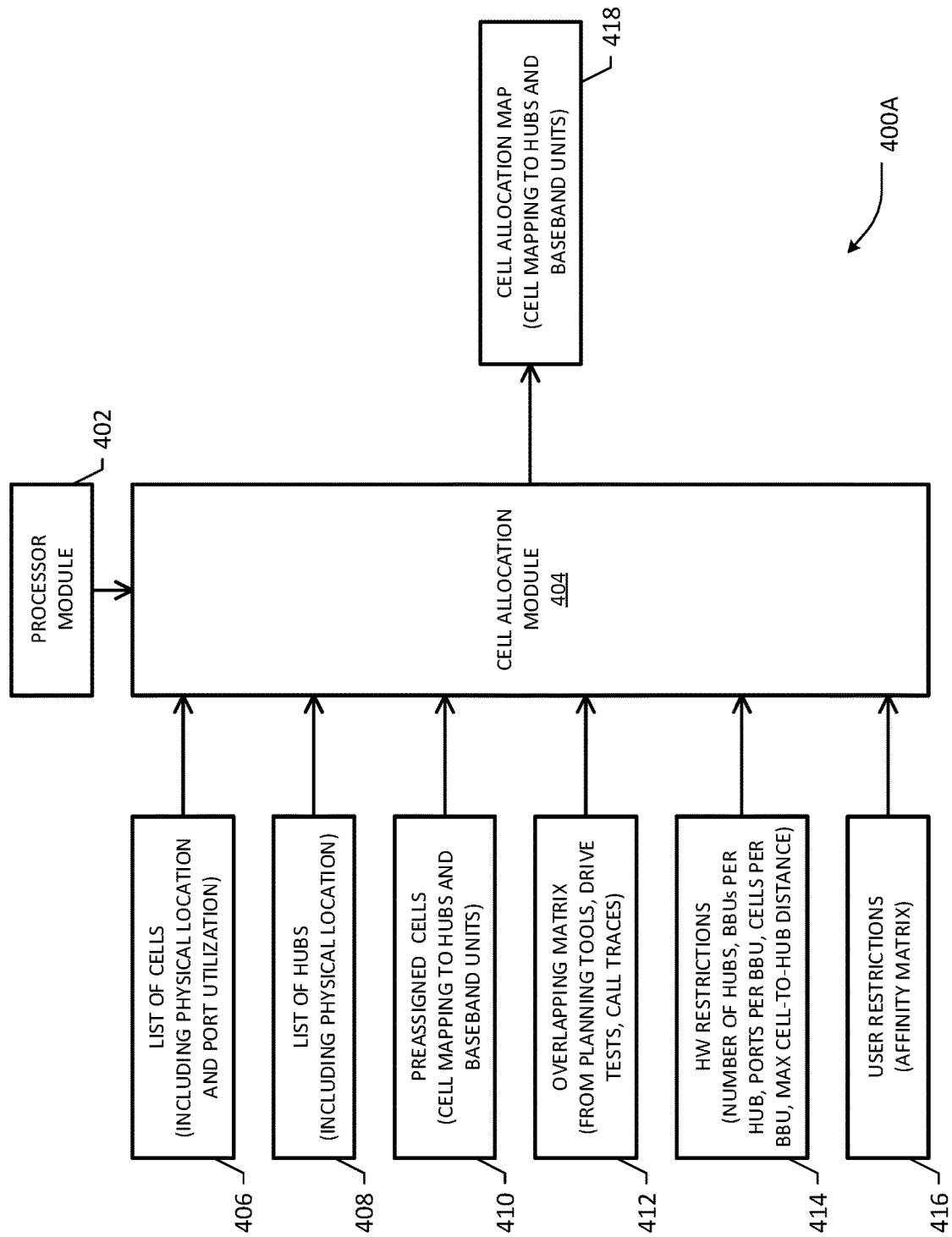
FIG. 4A is a block diagram of an apparatus, node, network element, or server that may be configured to determine a cell allocation map with respect to an example fronthaul network portion for purposes of a class of embodiments of the present patent disclosure.

FIG. 4A depicts a block diagram of an apparatus, node, network element, or server that may be configured as a platform 400A (e.g., platform 150 or any node therein as shown in FIG. 1) to determine a cell allocation map with respect to an example fronthaul network portion for purposes of a class of embodiments of the present patent disclosure. Preferably, platform 400A may be configured with one or more processor modules 402 operating in conjunction with suitable software/hardware/firmware modules, including a persistent memory having program instructions for executing a cell allocation module 404 to provide a novel apparatus and method for automatically assigning radio cells to hubs and to the BBUs connected to the hubs, with the target of maximizing the benefit of advanced C-RAN and E-RAN features while minimizing the number of consumed BBUs and hubs and respecting a list of user restrictions. By way of illustration, a number of inputs are provided, generated or otherwise obtained, to effectuate an example cell allocation process, inter alia: (i) a structure identifying overlapping traffic between every pair of cells in the network to configure; (ii) physical information per BBU and per hub; (iii) hardware constraints (e.g., number of hubs/BBUs, ports and latency requirements, etc.); and (iv) a list of preassigned cells to each hub, wherein an empty list means no preassigned cell. In FIG. 4A, the foregoing inputs and constraints are shown as a list or database structure of cells 406 (which may include cell identities, respective physical locations in terms of latitude/longitude, port identities, etc.); a list or database structure of BBU hubs 408 (which may include hub identities, respective physical locations, etc.); a list or database structure of preassigned cells 410; a list or database structure of overlapping traffic 412 (which may be obtained or generated from network planning tools, drive tests, call traces, etc.); a set of hardware constraints 414 (e.g., number of hubs, BBUs per hub, ports per BBU, maximum cell-to-hub distance, latency, etc.); an affinity matrix or database structure 416 (which identifies user restrictions, cell restrictions, etc.). A cell allocation map 418 may be obtained by executing the cell allocation process, which identifies the mapping of various cells to one or more hubs and individual BBUs therein.

At a high level, an example cell allocation process may comprise three steps or sub-processes that may be executed iteratively:

(i) Step 1: Hub selection. Higher priority is given to hubs with preassigned cells, and then to hubs with most availability (e.g., hubs with higher available gaps, where a gap may be determined as the minimum value between the available number of cells and the available number of ports, i.e., port-to-cell gap);

(ii) Step 2: Cell allocation to selected hub. Once a hub is selected, it is fully filled before continuing with the next hub. Preassigned cells are assigned first, and then those that can only be allocated to the current hub due to latency requirements. Finally, cells with highest overlapping with the existing cells in the hub are added to the hub, until it is full; and (iii) Step 3: Cell allocation to BBUs in selected hub. The cells assigned to a hub are allocated to the BBUs connected to that hub before continuing assigning cells to the next hub, with the following conditions: Preassigned cells are allocated to their BBUs first. Then, those BBUs are filled with the unallocated cells in the hub with highest overlapping. Finally, BBUs with no preassigned cells are filled with unallocated cells in a sequential way, i.e., a BBU must be full before starting assigning cells to another BBU: BBUs are firstly assigned the pair of unallocated cells in the hub with highest overlapping between them. Then, unallocated cells are added one-by-one, selecting those with maximum overlapping with respect to the cells already assigned to the BBU first.

Advantageously, an example embodiment may use smallest distance to hub as a criterion to select the best cell in case of equal overlapping value during Step 2 (cell allocation to selected hub) and Step 3 (cell allocation to BBUs). Advantageously, an example embodiment may include the current or forecasted traffic measurements per cell as additional inputs, and consider them as an extra capacity restriction to avoid exceeding the limits per BBU and per hub. Advantageously, an example embodiment may use a square symmetric affinity matrix as input to consider user restrictions to the allocation of every pair of cells to the same BBU, wherein Affinity 0: Pair of cells forced not to belong to the same BBU;

Affinity 1: Pair of cells with freedom to belong to the same BBU or not;

Affinity 2: Pair of cells forced to belong to the same BBU. These cells may be consolidated into single cell groups and assigned jointly to the hub.

Advantageously, an example embodiment may use an extra affinity matrix to add user constraints on the allocation of cells to the same hub.

Figure 4B:
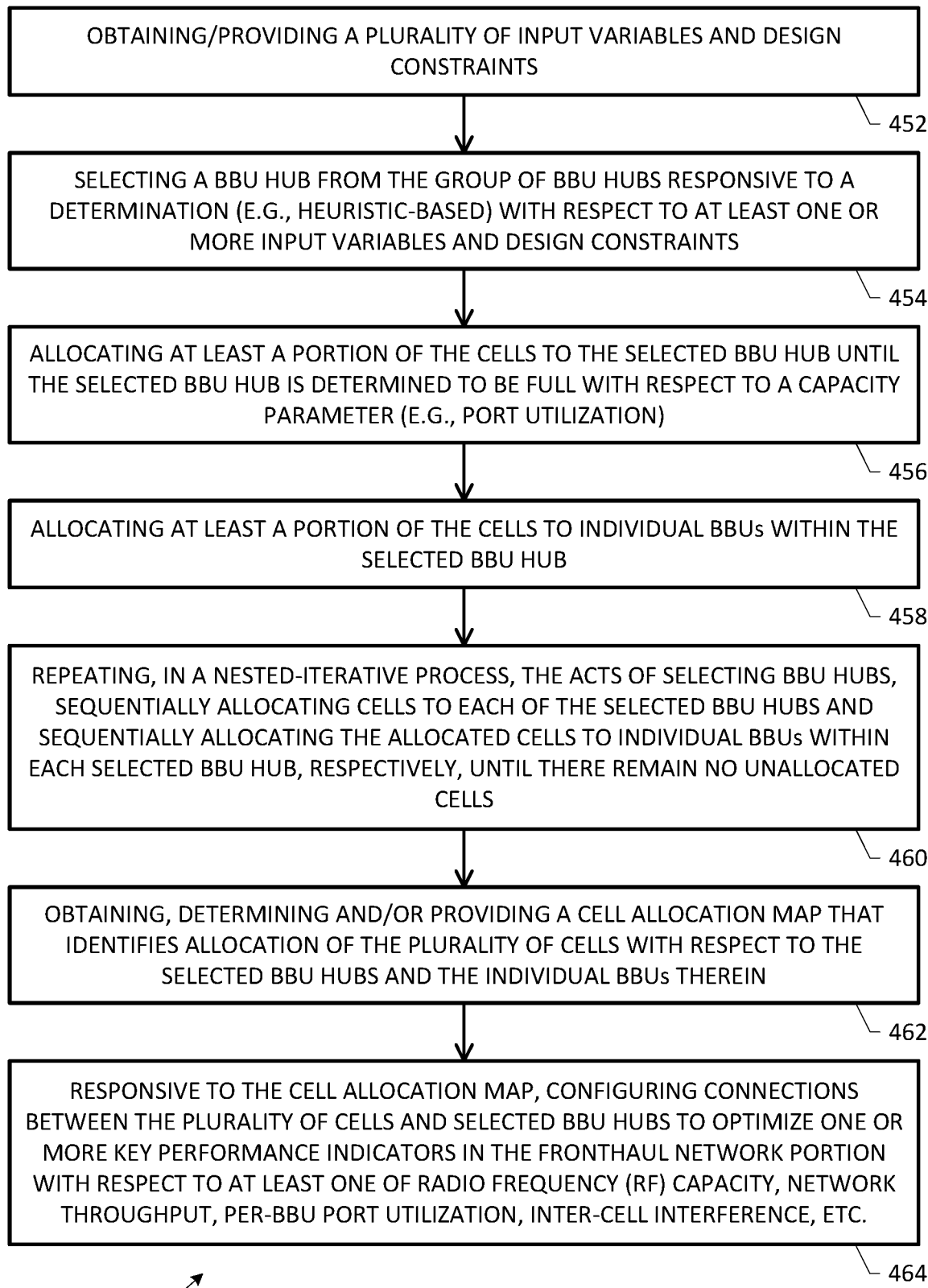
FIG. 4B is a flowchart of various blocks, steps and/or acts that may be (re)combined in one or more arrangements, with or without additional flowcharts of the present disclosure, for effectuating network connectivity configuration in a fronthaul network portion based on cell allocation according to one or more embodiments of the present patent disclosure.

FIG. 4B is a flowchart of various blocks, steps and/or acts that may be (re)combined in one or more arrangements, with or without additional flowcharts of the present disclosure, for effectuating network connectivity configuration in a fronthaul network portion based on cell allocation according to one or more embodiments of the present patent disclosure. In one embodiment, process 400B may commence by obtaining, providing, or otherwise configuring a plurality of input variables and design constraints with respect to a fronthaul network (block 452). At block 454, a BBU hub is selected from the group of BBU hubs responsive to a determination with respect to at least one or more input variables and design constraints (e.g., heuristic-based determination process). At block 456, at least a portion of the cells are allocated to the selected BBU hub until the selected BBU hub is determined to be full with respect to a capacity parameter (e.g., port utilization). Thereafter, the cells allocated to the selected BBU hub are allocated or assigned to individual BBUs (e.g., sequentially) within the selected BBU hub (block 458). Preferably, the acts of selecting BBU hubs, allocating cells to each of the selected BBU hubs sequentially and assigning the allocated cells to individual BBUs sequentially within each selected BBU hub, respectively, may be repeated in a nested-iterative process (i.e., a sequential nested iterative process) until there remain no unallocated cells (block 460). Responsive thereto, a cell allocation map is thereby obtained, determined and/or otherwise provided, which identifies allocations of the plurality of cells/RRUs with respect to the selected BBU hubs and the individual BBUs therein (block 462). As set forth at block 464, appropriate fronthaul connections between the plurality of cells and selected BBU hubs may be configured (e.g., automatically, on-demand, on-schedule, or operator-triggered, etc.) responsive to the cell allocation map so as to optimize one or more key performance indicators (KPIs) in the fronthaul network portion with respect to at least one of radio frequency (RF) capacity, network throughput, per-BBU port utilization, and inter-cell interference, etc.

Additional details and/or further variations with respect to an implementation of the foregoing embodiments are set forth in the following sections.

As noted above, example embodiments are preferably configured to assign radio cells to hubs and BBUs with the target of maximizing the benefit of advanced C-RAN and E-RAN features while minimizing the hardware resources and respecting a configurable list of design restrictions. For purposes of an example implementation, hardware resources may represent the required number of BBU and hub units, wherein examples of advanced E-RAN features comprise Carrier Aggregation and UL CoMP and an example of advanced C-RAN feature comprises DL CoMP.

As illustrated in FIGS. 4A/4B, an example embodiment of the process may be implemented as an executable software module or program on a general-purpose computer machine (e.g., personal computer, computing server, data center node, management node, etc.), using one or more following inputs, without limitation:

A list of cells in the network, including physical information: latitude and longitude per cell and per hub, and port utilization per cell. Port utilization is normally 1 for macrocells, but it might be lower for collocated small cells that can be cascaded on the same port. In these cases, the port utilization is equal to 1 divided by the maximum number of collocated small cells that can be cascaded on the same port.

An overlapping matrix A: In accordance with the teachings of the present patent disclosure, a unidirectional overlapping matrix $A^u$ may be defined as a square matrix with size equal to the number of cells in the network, of which elements:

$$A_{j,k}^u \in [0,1]$$

wherein the values in the range [0,1] represent the ratio of traffic in which cells #j and #k have a predetermined or predefined good service level, compared to the traffic in which cell #j has good service level. In an example implementation, service level can represent, for example, coverage and/or signal quality parameters, which may be determined as at least one of a Reference Signal Received Power (RSRP) value over a threshold (e.g., a first threshold), a Reference Signal Received Quality (RSRQ) value over a threshold (e.g., a second threshold), and a Reference Signal to Interference-plus-Noise Ratio (RS-SINR) value over a threshold (e.g., a third threshold).

The input overlapping matrix A may be obtained as a symmetric square matrix derived from $A^u$, of which elements $A_{j,k}$ are a measure of the mutual service level overlapping between cells #j and #k, defined as follows:

$$A_{j,k} = A_{k,j} = (A_{j,k}^u)^2 + (A_{k,j}^u)^2 \qquad \text{Eqn. (1)}$$

where $A^u$ is non-symmetric, i.e., $A_{j,k}^u \neq A_{k,j}^u$.

In an example embodiment, overlapping values can be obtained from RSRP and RS-SINR maps generated by planning/predicting tools or obtained through drive tests or call traces. Yet another multi-dimensional input variable may comprise a list of hubs that identifies, e.g., where to allocate cells, including physical information: latitude and longitude per hub, as noted above. Yet another multi-dimensional input variable may comprise a list of preassigned cells to each hub. Various other inputs comprise hardware constraints and user restrictions as also noted previously. In one arrangement, user restrictions may comprise cell allocation restrictions based on a list of cells that must belong to the same BBU, a list of cells that must belong to different BBUs, and a list of cells that may be allowed to belong to the same BBU or not. An affinity symmetric matrix with size equal to the number of cells in the network may be defined wherein values between a pair of cells #j and #k may be defined as follows: Affinity value of "x" if the cells #j and #k are forced to belong to different BBUs; Affinity value of "y" if the cells #j and #k have freedom to belong to the same BBU or not; and Affinity value of "z" if the cells #j and #k are forced to belong to the same BBU. As previously noted, affinity values {x}, {y} and {z} may take on values "0"; "1"; and "2" in an example implementation. One skilled in the art will recognize upon reference hereto that various other types of variables, e.g., discrete variables, continuous variables, etc. may be used for defining inter-cell affinities between a pair of cells for purposes of an embodiment of the present patent disclosure.

Further, the cell allocation restrictions may be particularized based on user settings in an example implementation, for instance, including a determination as to whether collocated cells must be forced or not to belong to the same BBU. Still further, an allocation strategy may be implemented in an example embodiment for purposes of later allocation of cells to BBUs when estimating the number of cells per hub. By way of illustration, such strategy may be configured as a rules-based strategy wherein the following rules are exemplary:

Rule 1: Macrocell "as is" and small cells on a different BBU;

Rule 2: Marcocell "as is" and small cells on a same BBU; and

Rule 3: Free mixing of macrocells and small cells.

Preferably, an example cell allocation process is configured to assign cells to the hubs sequentially, i.e., a hub must be completely full (e.g., with respect to certain predetermined capacity such as port utilization) before adding cells to any other hubs. Once a hub is full, the allocated cells are further assigned to the individual BBUs of the hub also sequentially. Skilled artisans will appreciate that the two-stage sequential approach set forth herein provides and facilitates various aspects of hardware resource optimization, e.g., with respect to the number of BBUs/hubs needed for configuring a given number of cells in the network.

Set forth below are further details with respect to the three high level sub-processes (or, Steps) as previously noted.

Step 1: Hub Selection

The process may be configured to fill those hubs with some preassigned cell first. If there is more than one hub with at least one preassigned cell, priority is given to the hub with the highest number of gaps, determined as the minimum value between the available number of cells and the available number of ports. Then, it will fill those hubs with non-preassigned cells, again with higher priority to hubs with higher number of available cells per hub.

After selecting a hub, the process will continue with STEPS 2 and 3 before selecting the next hub.

Step 2: Allocation of Cells to the Selected Hub

Once a hub is selected, it is fully filled before continuing with the next hub. The selection of the first cell (or group of cells if they have affinity 2) for the current hub is done with special conditions, following the next sub-step:

STEP 2.1: Preassigned cells have the highest priority. All preassigned cells will be automatically assigned to their hub. Unallocated cells that can only be allocated to the current hub due to maximum distance restriction will also be automatically assigned to it. If there are no allocated cells to a hub using the previous criterion, the first allocated cell will be the closest cell to that hub.

The selection of the next cell or group of cells to be allocated to the current hub is done following the next sub-steps:

STEP 2.2: The process is configured to create the list of candidate cells that can be connected to the hub according to distance and/or some relevant cost function based thereon.

STEP 2.3: The process is configured to select the candidate cell (or group of cells with affinity 2 among them) with lowest number of candidate hubs to which they can be connected according to the distance/cost function. In case of having more than one cell (or group of cells with affinity 2) with the same lowest number of candidate hubs, select the cell or group of cells with highest overlapping with the rest of cells already allocated to the hub. The overlapping between a cell and a group of cells, or between two groups of cells may be determined as the sum of all the overlapping values as defined in Equation (1), associated with all possible combinations of pairs of cells formed by the cells in the first and the second group. In case of equal overlapping, select the closest cell/group to that hub.

STEP 2.3 is repeated until the hub is full.

Step 3: Allocation of Cells to BBUS in Selected Hub

The cells assigned to a hub are allocated to the BBUs connected to that hub before continuing assigning cells to the next hub. It should be noted that in an example embodiment, if the available C-RAN features among cells connected to the same BBU only allow intra-frequency coordination (e.g. DL CoMP), overlapping equal to 0 must be assumed between pairs of cells operating on different frequency carriers.

The allocation of cells to the BBUs in a hub may be performed in three sub-steps:

STEP 3.1: Allocation of preassigned cells to their BBUs.

When using allocation strategy based on rule 1 or 2 set forth above, groups of unallocated collocated macrocells are also assigned to their own empty BBU within the hub according to an example embodiment.

STEP 3.2: Allocation of cells to BBUs that contain preassigned cells.

In this sub-step, the process allocates cells to BBUs with preassigned cells (or with macrocells, in case of rules 1 and 2). In case of allocation strategy based on rule 1, BBUs with macrocells cannot host any other cell, and they would be skipped in this step. This is done by the process upon finding the unallocated cell (or groups of cells if they have affinity 2) in the hub with highest overlapping with any of the BBUs. The overlapping between a candidate cell/group and a BBU is the sum of the overlapping values between all pairs of combinations of the candidate cell/group and the cells already assigned to that hub. The candidate group can be divided into subgroups of candidate cells that match the available gaps in the BBUs.

The process is repeated until all the BBUs with preassigned cells (or macrocells, in case of rules 1 or 2) are full.

STEP 3.3: Allocation of cells to BBUs with no preassigned cells.

In this sub-step, the process allocates cells to the rest of BBUs.

STEP 3.3.1: Selection of the initial cell/group. This is executed by the process upon selecting the pair of cells/groups with highest overlapping and assigning them to the first empty BBU. This is not necessary if there are remaining cells from the previous BBU during STEP 3.2.

STEP 3.3.2: The process is configured to continue assigning cells to the BBU one-by-one, until it is full. Selection is based on maximum overlapping with respect to the cells already assigned to the BBU. In case of equal overlapping, the process selects the cell/group with smallest average distance (or a minimal cost function) to the cells already assigned to the BBU. Once the BBU is full, the process iterates to STEP 3.1 again, and repeats the loop. If the last group needs more gaps than available in the BBU, the group may be divided into two subgroups, and the remaining cells are assigned to the next empty BBU as its initial cell/group in STEP 3.1. The subgroup assigned to the current BBU is the combination of cells in the group with maximum overlapping that matches the remaining gaps.

Once all BBUs are full, the process iterates to STEP 1 again to select the next hub. If there are pending cells in the hub with no assigned BBUs, the process deallocates them from the hub, so that they can be assigned to other hubs. One skilled in the art will recognize that such a situation can arise due to other hardware limitations different from the number of cells per BBU, such as number of ports per BBU or maximum traffic per BBU or hub.

Figure 5A:
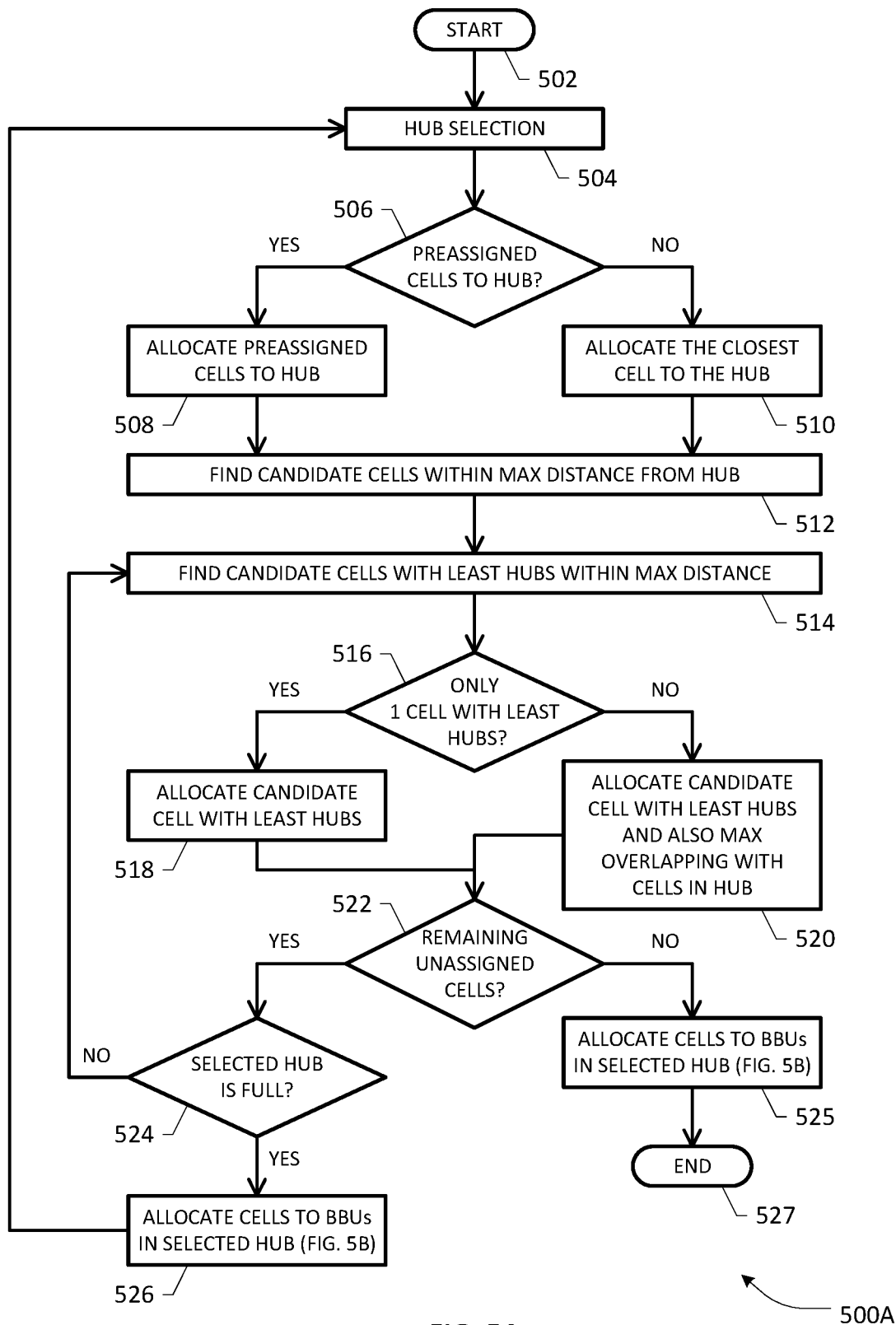
FIGS. 5A and 5B are flowcharts of various blocks, steps and/or acts that may be (re)combined in one or more arrangements, with or without additional flowcharts of the present disclosure, for determining cell allocation according to one or more embodiments of the present patent disclosure.
Figure 5B:
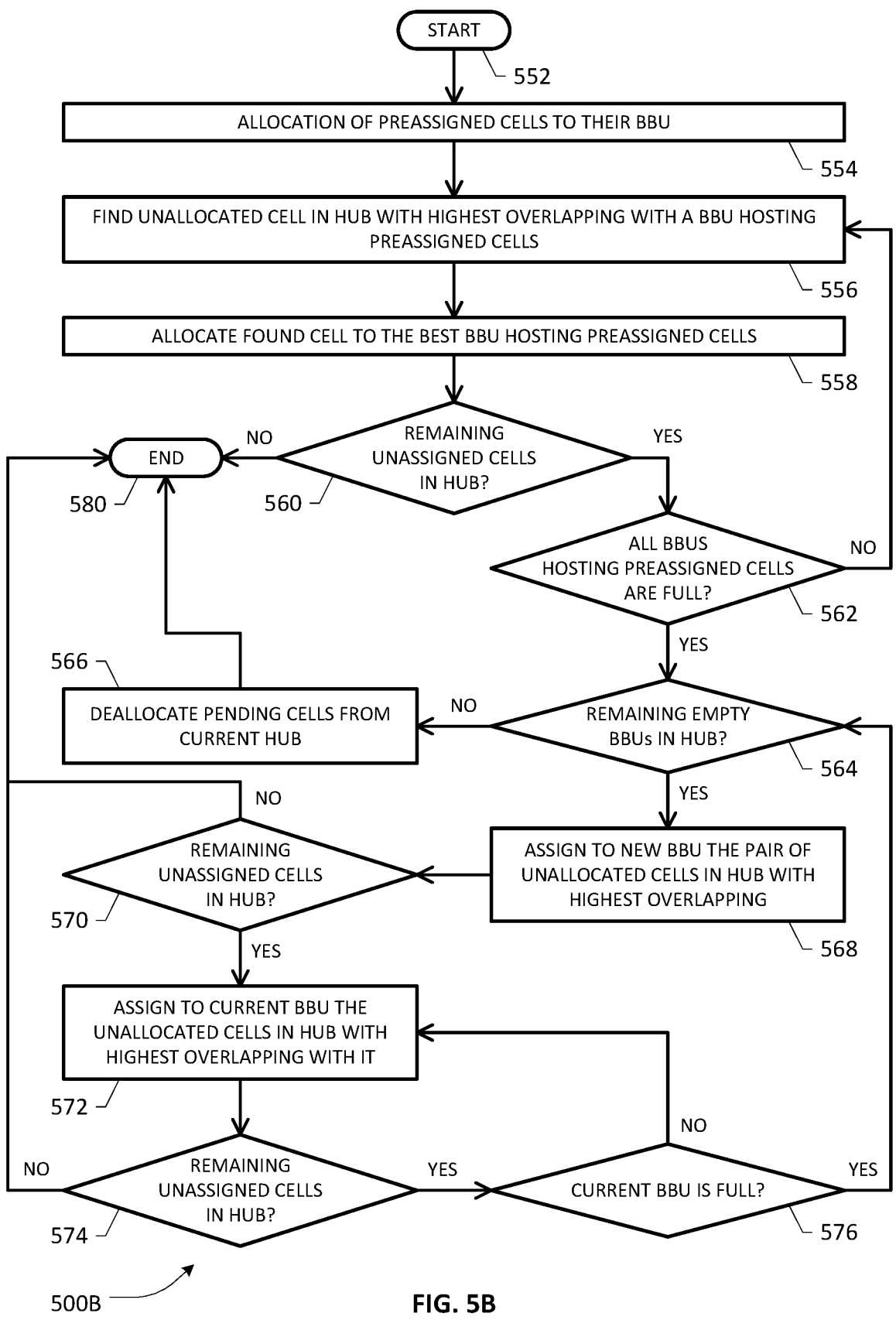

Turning attention to FIGS. 5A and 5B, depicted therein are flowcharts of various blocks, steps and/or acts that may be (re)combined in one or more arrangements, with or without additional flowcharts of the present disclosure, for determining cell allocation according to one or more embodiments of the present patent disclosure wherein no user restrictions (e.g., such as those described above) are assumed. Skilled artisans will however recognize that various process inputs and other constraints set forth in the foregoing sections are equally applicable with respect to the overall process flow shown in FIGS. 5A and 5B. Example process 500A commences with hub selection (blocks 502 and 504), consistent with the embodiments described above. Once a hub is selected, a determination is made as to whether there are any preassigned cells to the selected hub, as set forth at block 506. If so, the preassigned cells are allocated to the selected hub (block 508). Otherwise, the closest cells or cells with a minimum cost function relative to the selected hub are allocated (block 510). At block 512, a plurality of candidate cells satisfying a predetermined requirement (e.g., distance, latency, or some other cost function) are determined. Candidate cells with least number of hubs are then determined (block 514). If there is only one candidate cell with a least number of hubs, it is allocated to the selected hub (blocks 516, 518). Otherwise, a candidate cell with a least number of hubs and having a maximal overlapping with the already assigned cells in the selected hub is allocated (block 520). At block 522, a determination is made as to whether there are any remaining unassigned cells. If so, a further determination is made to determine whether the selected hub is full (block 524). If the selected hub is full, control of example process 500A flows to process 500B, which may be executed to sequentially allocate the assigned cells to the individual BBUs in the selected hub (block 526). As illustrated in FIG. 5A, flow control loops back to the hub selection process (block 504) upon completion of the sequential intra-hub allocation process of block 526, thereby (re)commencing the process of sequentially selecting (any) additional hubs.

On the other hand, if there are remaining unassigned cells and the selected hub is not full (blocks 522, 524), flow control loops back to block 514 to find candidate cells with least number of hubs subject to maximum distance/cost function constraints as before. If there are no remaining cells (block 522), the cells assigned to the selected hub are allocated to the individual BBUs therein (block 525), essentially similar to block 526, except that the process flow exits upon executing the sequential intra-hub allocation process, as exemplified by block 527.

Process 500B of FIG. 5B, which illustrates an implementation of sequential allocation of cells to individual BBUs within a hub, may commence from either one of two entry flow points from process 500A, as shown at blocks 525, 526 of FIG. 5A. At block 554, cells preassigned to specific BBUs within the hub are identified and preferentially allocated. Unallocated cells in the hub are determined and assigned to a best BBU therein based on, e.g., overlapping (blocks 556, 558). If there are no unassigned cells in the hub (block 560), the process flow exits (block 580), and may return to either block 527 (for completion of the overall cell allocation process) or block 504 (for selection of additional hubs) of process 500A, as discussed above. If there are remaining unassigned cells in the hub (block 560), a further determination is made as to whether all BBUs hosting preassigned cells are full (block 562). If not, the process flow returns to block 556 to find or determine unallocated cells and allocate them to a best BBU(s) as before (block 558). On the other hand, if all the BBUs with preassigned cells are full (block 562), a still further determination is made to determine if there are any empty BBUs in the hub (block 564). If there are no empty hubs, the pending cells are deallocated from the current hub (block 566) and the process flow exits (block 580) so as to return to hub selection in FIG. 5A.

If it is determined that there are empty BBUs in the current hub, cell allocation may be made based on determining a new BBU and assigning a pair of unallocated cells having the highest overlapping in the hub (block 568). If there are still unassigned cells remaining (block 570), they may be assigned to the current BBU based on overlapping (block 572). This process may be repeated in a loop until the current BBU is full, as set forth at blocks 574, 576. If the current BBU is full (block 576), the process flow returns to determining whether there are any remaining empty BBUs in the hub (block 564). In one embodiment, for any remaining unallocated cells, such remaining unallocated cells may be allocated to BBUs having no preassigned cells one-by-one, taking into account at least one of (i) any overlapping between a candidate cell to be allocated and cells already assigned to the BBU; and (ii) a port-to-cell gap associated with the BBU, for example, as part of blocks 568, 572. If there are no unassigned cells in the hub, as determined either at block 570 or block 574, the process flow exits (block 580) so as to return to an appropriate action in FIG. 5A.

Based on the foregoing, it can be appreciated that a hierarchical (or, nested or multi-staged) sequential allocation process as set forth above to fill the hubs and BBUs therein allows a determination of optimal allocation of cells while ensuring that only a minimum amount of resources will be necessary to service the cells in a network. Accordingly, the total cost of ownership (TCO) comprising capital expenditures (CAPEX) and operating expenditures (OPEX) relating to the hardware is advantageously minimized. On other hand, the target of maximizing the advantages of advanced C-RAN/E-RAN features in the design and deployment of a fronthaul network continues to be maintained in configuring the cellular-BBU connectivity based on the cell allocation data that is determined according to an embodiment of the present patent disclosure.

Skilled artisans will further recognize that embodiments set forth herein address and overcome the following deficiencies, without limitation, regarding current C-RAN/E-RAN implementations. For example, existing solutions pay most attention to boosting the radio benefit of the E-RAN advanced features. However, they give less priority to cost associated with hardware unit deployment. Whereas a current solution allows fast cell allocation, it uses the number of hardware units (BBUs or hubs) as a hard, fixed constraint input. This means that all the available BBUs are allocated, regardless of whether they are really needed or not. Additionally, cells are assigned individually, not considering the possibility of extra user restrictions such as forcing certain cells (e.g. collocated) to belong to the same clustering group, or preventing non-collocated cells from belonging to the same clustering group. This solution has also the potential problem of ending up with unassigned cells that cannot be allocated to hubs within the maximum distance because they are already full, whereas an earlier allocation of those cells with fewer suitable hubs within the maximum distance range would prevent the problem from happening. Another solution addresses some user constraints, but those related to minimizing hardware cost are considered as soft requirements. In other words, they are not treated as targeted constraints required to be fulfilled.

It will be further appreciated that embodiments set forth herein may be specifically configured to provide and/or facilitate one or more following features, inter alia. An example embodiment may be configured to provide radio cell to hub mapping and radio cell to BBU mapping that maximize RF capacity, as well as BBU and hub utilization. The sequential allocation approach targets at maximizing the benefit of the advanced C-RAN and E-RAN solutions but gives operators the possibility to put higher priority on minimizing the number of required BBUs and hubs, and therefore the total costs associated with hardware unit deployment as noted above. An example embodiment may be configured to provide a reduction in the probability of ending up with unassigned cells that cannot be allocated to any hubs due to latency requirements because they are already full. This is possible by prioritizing the allocation of cells with fewer hubs within their maximum distance. An example embodiment may be configured to support high flexibility for addition of user restrictions. It can be seen that the rule-based use restrictions described above advantageously support various strategies to allocate different types of cells to hubs, based on real requests/needs from customers, in additional/alternative embodiments. For example, the rule relating to "Macrocell "as is" and small cells on different BBU" comports well with the case in which the macrocells are still deployed in legacy architecture (e.g., Distributed RAN or D-RAN), and the operator would like to keep them on the same DU/BBU and add new small cells into new BBUs. Likewise, the rule relating to "Macrocell "as is" and small cells on same BBU" is amenable to an implementation where the macrocells are still deployed in legacy architecture (e.g., D-RAN), and they will be migrated to BBUs in C/E-RAN architecture, together with new small cells. Still further, the rule relating to free mixing of macros and small cells allows maximum flexibility in a fronthaul design, deployment and (re)configuration in accordance with an embodiment of the present invention. The example cell allocation process is also configurable or extensible in that additional user restrictions can be added as needed depending on future implementations and requirements, e.g., forcing collocated cells or cells belonging to user-defined groups to belong to the same/different hub/BBU. By way of illustration, an example of group of cells that must belong to the same hub are cells on the same side of a city divided by a river or some other natural/artificial boundary. Likewise, certain cells can be forced to be preassigned to particular BBUs and/or hubs depending on a particular operator's implementation.

In further aspects, another class of embodiments of the present patent disclosure are directed to systems, methods and non-transitory computer-readable storage media with respect to configuring BBUs for facilitating inter-BBU coordination (e.g., inter-site baseband connectivity) in order to better leverage one or more advanced E-RAN features in a network implementation. As noted elsewhere in the present patent disclosure, baseband coordination is a key element in achieving high network performance, and an E-RAN implementation in the fronthaul may be configured to extend KPIs such as, e.g., the user experience, network throughput, and efficiency benefits of coordination, etc., across the entire network. It should be appreciated that in such an implementation based on E-RAN, every BBU may be configured to coordinate/cooperate with any adjacent one, whether in a centralized, distributed or hybrid network architecture, based on configurable BBU partnerships or coordination sets (CSs). Further, such highly flexible implementations not only support hyper-scalable architectures but also help advance the operator's migration to Cloud RAN.

Whereas the benefits of most centralized baseband deployments are contained to a specific area in the existing implementations, it will be seen that example embodiments relating to E-RAN optimization advantageously provide a scalable architecture based on generating intelligent BBU partnerships, wherein optimal basebands are interconnected through high-performance transport networks (e.g., Ethernet), enabling the complete network to operate as one unified coordination area. An E-RAN implementation according to an example BBU partnership configuration scheme of the present disclosure can therefore ensure that capabilities such as Carrier Aggregation (CA) and CoMP may be extended to improve the user's application coverage network-wide irrespective of the baseband deployment scenario.

Figure 7A:
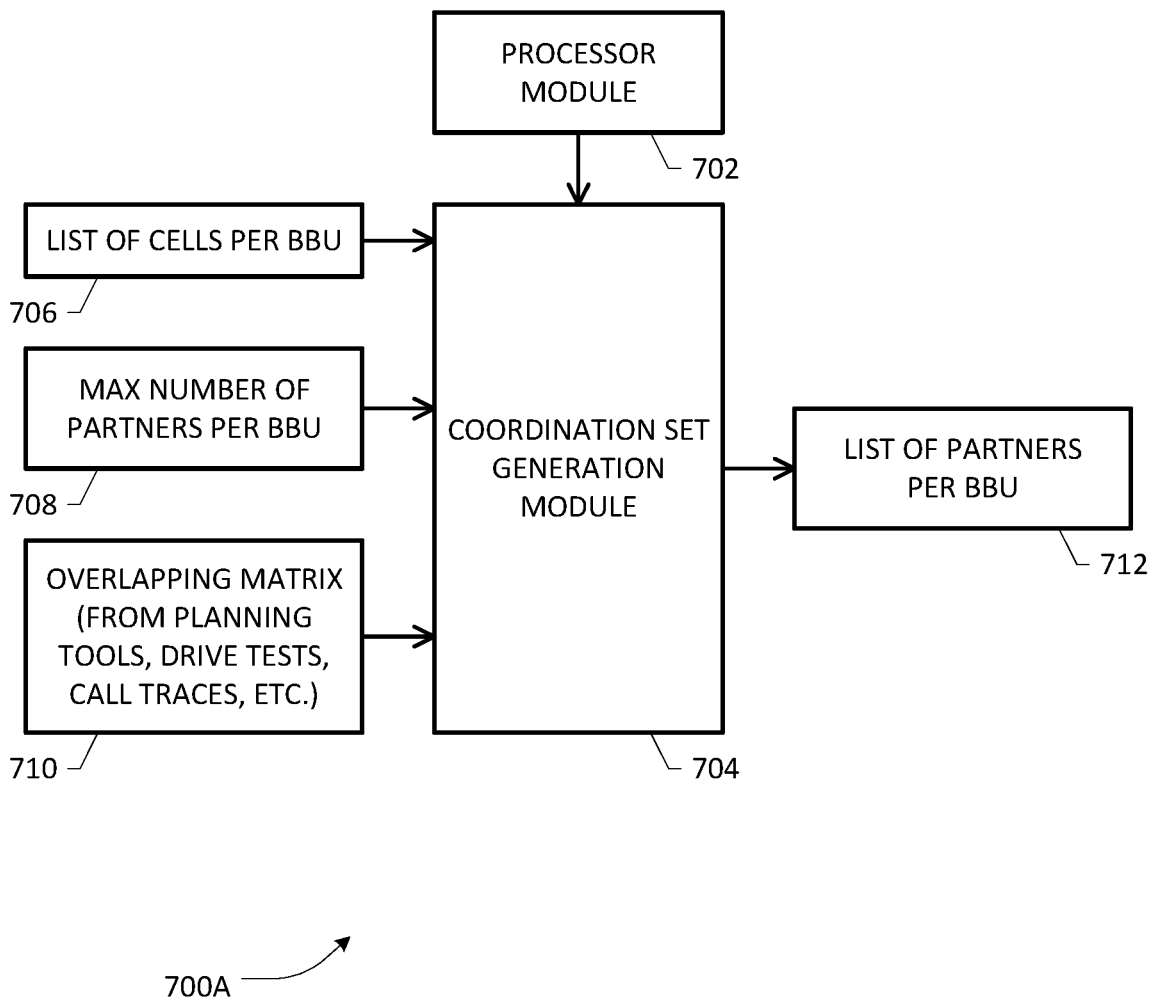
FIG. 7A is a block diagram of an apparatus, node, network element, or server that may be configured to determine BBU coordination sets with respect to an fronthaul network portion for purposes of another class of embodiments of the present patent disclosure.

FIG. 7A is a block diagram of an apparatus, node, network element, or server that may be configured as a platform 700A (e.g., platform 150 or any node therein as exemplified in FIG. 1) to determine BBU coordination sets with respect to a fronthaul network portion for purposes of an example embodiment of the present patent disclosure. Similar to the platform 400A shown in FIG. 4A, platform 700A may be configured with one or more processor modules 702 operating in conjunction with suitable software/hardware/firmware modules, including a persistent memory having program instructions for executing a CS generation module 704 to provide a novel apparatus and method to select and/or assign partner BBUs (which may or may not be in the same hubs), with the target of maximizing the benefit of advanced E-RAN features. By way of illustration, a number of inputs are provided to effectuate an example CS generation process (also referred to as BBU partnership generation): (i) a list of cells assigned to each BBU (block 706); (ii) a maximum number of partner BBUs allowed per BBU (block 708); and (iii) a matrix or other to suitable data structure for identifying the traffic overlapping between every pair of cells per BBU in the network to configure (block 710). In one implementation, an example CS generation process may be executed separately for every hub in the network. Further, an example CS generation process may be executed separately for every advanced E-RAN feature being configured for the network (e.g., CA, UL CoMP, etc.). Additionally, it should be appreciated that per-BBU cell assignment may be obtained in a number of ways and an example CS generation process of the present disclosure may be practiced regardless of how the cell assignment in a network has been configured. Accordingly, in one embodiment, an example CS generation process may be configured to operate based on the cell allocation scheme described previously although it is not a requirement.

Similar to the teachings set forth above, various inputs and constraints to the example CS generation module 704 may comprise, inter alia, one or more per-BBU cell lists, with physical information per cell and per hub; hardware constraints (e.g., number of hubs/BBUs, ports and latency requirements, etc.; a list or database structure of traffic overlapping, which may be obtained or generated from network planning tools, drive tests, call traces, etc.); as well as inter-BBU and/or inter-hub distances and related cost functions, and so on. Preferably, a CS or partnership map 712 may be obtained by executing the CS generation process, which identifies a set of partnering BBUs for each BBU of the hub/network, and/or for one or more E-RAN features, either alone or taken in any reasonable combination thereof.

At a high level, an example CS generation process may comprise three main steps or sub-processes that may be executed iteratively:
(i) Step 1: Reduction of the traffic overlapping matrix per pair of cells to a traffic overlapping matrix per pair of BBUs, by aggregating the values associated with the cells of the same BBU;
(ii) Step 2: Creation of a list of candidate pairs of BBUs, also referred to as candidate partnerships, sorted in a particular order, e.g., in a descending order with a decreasing value of traffic overlapping; and
(iii) Step 3: Selection of the partnerships. Partnerships are selected sequentially, starting from the beginning of the sorted/ordered list of candidate partnerships. The selection of a partnership indicates mutually adding each of both BBUs to the CS of the other BBUs. In one example embodiment, a partnership may be discarded if its addition indicates exceeding the maximum number of partners allowed per BBU.

Advantageously, an example embodiment may be configured to execute a fourth step or sub-process (e.g., optionally or additionally) for final fine-tuning of a generated CS/partnership set in case at least one candidate partnership was discarded and not all CSs are full:
(vi) Step 4: Final fine-tuning. This step comprises finding combinations of a certain number of discarded partnerships (e.g., two discarded partnerships) to replace partnerships selected in Step 3, for which the following conditions are satisfied: (a) removing a partnership selected in Step 3 makes adding two discarded partnerships possible in terms of maximum number of partners per BBU; and (b) the sum of the traffic overlapping values of the added partnerships is higher than or equal to the traffic overlapping value of the removed partnership.

Advantageously, an example embodiment may be configured to execute Step 4 by also searching for combinations of more than two discarded partnerships to replace combinations of more than one partnership.

Advantageously, an example embodiment may be configured to execute the process for more than one hub, if hubs are close enough (e.g., within the latency and/or cost function requirements) to make E-RAN coordination between their BBUs possible. On the other hand, the case of BBUs of different hubs that cannot be coordinated due to exceeding the maximum distance to guarantee the RRU-to-BBU latency requirements can be considered by setting BBU overlapping equal to "0" according to one example implementation.

Figure 7B:
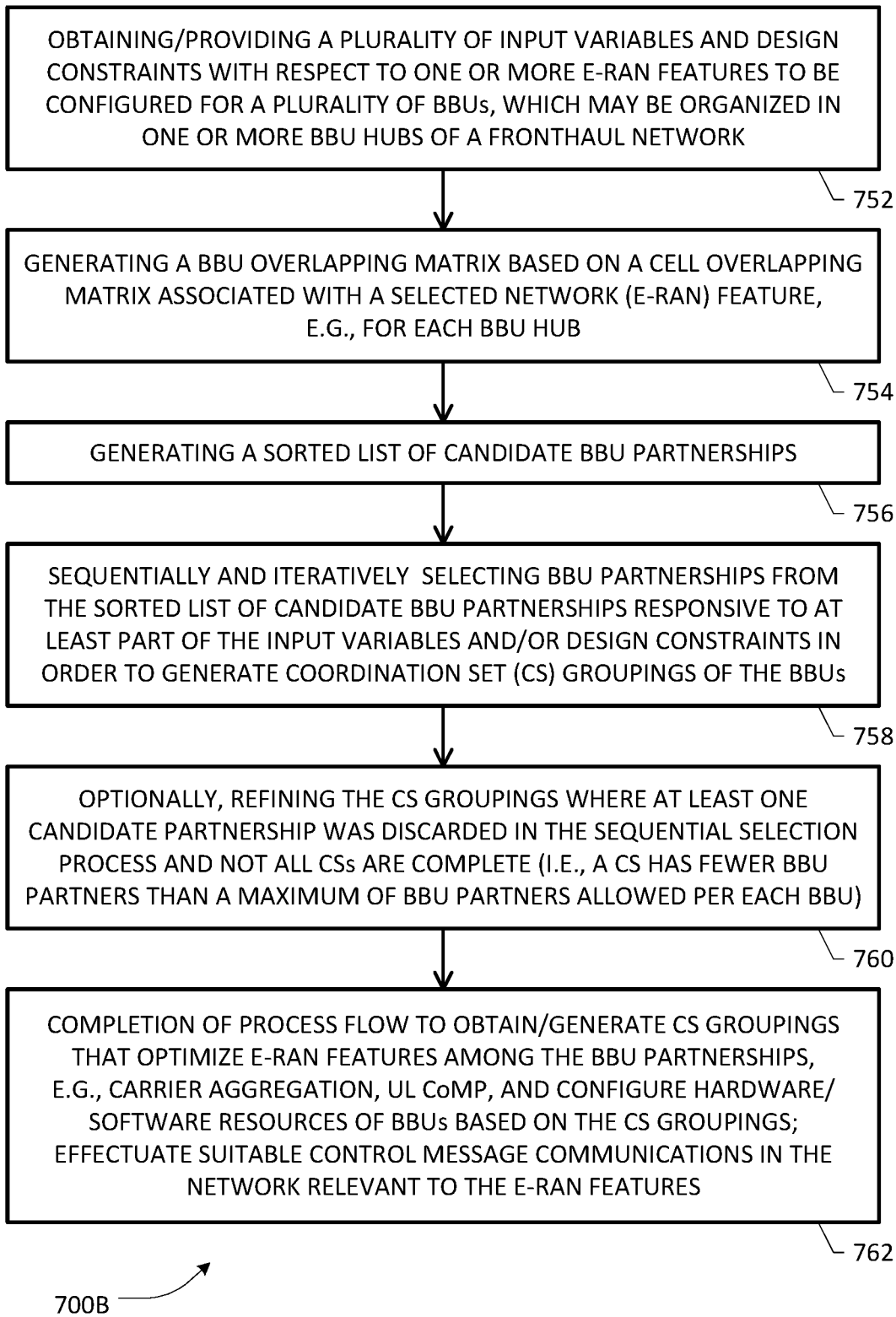
FIG. 7B is a flowchart of various blocks, steps and/or acts that may be (re)combined in one or more arrangements, with or without additional flowcharts of the present disclosure, for configuring BBU coordination in a fronthaul network portion according to one or more embodiments of the present patent disclosure.

FIG. 7B is a flowchart of various blocks, steps and/or acts that may be (re)combined in one or more arrangements, with or without additional flowcharts of the present disclosure, for configuring BBU coordination in a fronthaul network portion according to one or more embodiments of the present patent disclosure. In one embodiment, process 700B may commence by obtaining, providing, or otherwise configuring a plurality of input variables and design constraints with respect to one or more E-RAN features to be configured for a plurality of BBUs, which may be organized in one or more BBU hubs of a fronthaul network (block 752). At block 754, a BBU overlapping matrix may be generated based on a cell overlapping matrix associated with a selected network (E-RAN) feature, e.g., for each BBU hub or for at least portion of the fronthaul network. At block 756, a sorted/ordered list of candidate BBU partnerships may be generated. Thereafter, BBU partnerships from the sorted/ordered list of candidate BBU partnerships may be selected sequentially/iteratively, e.g., responsive to at least part of the input variables and/or design constraints in order to generate CS groupings of the BBUs (i.e., one set of partners for each BBU), as set forth at block 758. Optionally, the CS groupings may be refined or fine-tuned (block 760), where at least one candidate partnership was discarded in the sequential selection process and not all CSs are complete (i.e., a CS has fewer BBU partners than a maximum of BBU partners allowed per each BBU). In one embodiment, a reciprocity relationship between the BBU partners may be defined and imposed/applied at block 760 in order to achieve the fine-tuning. Thereafter, the process flow may be completed and the CS groupings may be obtained, generated and/or otherwise provided, whereupon the BBUs may be configured to effectuate suitable control message communications according to the partnerships for facilitating optimization of one or more KPIs and E-RAN features among the BBU partnerships, e.g., carrier aggregation, UL CoMP, etc. Also, hardware/software resources of BBUs may be configured based on the CS groupings to enable tight cooperation and inter-site radio resource coordination (block 762).

Additional details and/or further variations with respect to an implementation of the foregoing embodiments are set forth in the following sections.

As previously noted, example embodiments may be configured to assign reciprocal and/or nonreciprocal partner BBUs to each BBU of a fronthaul network with the target of maximizing the coordination benefit of advanced E-RAN features. Allocation of cells to BBUs and cells to hubs may be performed in a number of ways, including but not limited to the embodiments set forth previously. As illustrated in FIGS. 7A/7B and related Figures described below, an embodiment of the process may be executed through a software program on a general-purpose computer machine (personal computer or computing server, data center node, management node, or a network element or node, etc.).

In one example embodiment, the process may be executed separately for every hub, and for every advanced E-RAN feature. In this description, two particular E-RAN features will be considered by way of illustration: CA and UL CoMP. The process may be configured to use the following inputs, including but not limited to, for every particular execution:
 (i) List of cells assigned to each BBU connected to the hub.
 (ii) Maximum number of partner BBUs per BBU.
 (iii) An overlapping matrix A associated with the particular E-RAN feature: In accordance with the teachings of the present patent disclosure, a unidirectional overlapping matrix $A^u$ may be defined as a square matrix with size equal to the number of cells in the hub or network, of which elements:

$$A_{j,k}^u \in [0,1]$$

wherein the values in the range [0,1] represent the ratio of traffic in which cells #j and #k have a predetermined or predefined good service level, compared to the traffic in which cell #j has good service level. In one variation, the maximum number of partners allowed per BBU may be the same, i.e., every BBU has the same maximum number of partners. In another variation, the maximum number of partners allowed per BBU may be variable, i.e., different BBUs may have different maximum number of partners. In one example implementation, service level may be defined differently based on the particular E-RAN feature being configured for the network. For CA, service level could be considered as coverage (RSRP over threshold) and signal quality (RS-SINR over threshold). Overlapping between cells on the same carrier is obviously equal to zero. For UL CoMP, service level could be considered as to coverage (RSRP over threshold) and dominant coverage (RSRP higher than best server's RSRP minus an offset).

Similar to teachings set forth previously, the input overlapping matrix A may be obtained as a symmetric square matrix derived from $A^u$, of which elements $A_{j,k}$ are a measure of the mutual service level overlapping between cells #j and #k, defined as follows except that the dimensionality may be different in this scenario depending on whether intra-hub level or inter-hub level partnerships are being configured:

$$A_{j,k} = A_{k,j} = (A_{j,k}^u)^2 + (A_{k,j}^u)^2 \qquad \text{Eqn. (2)}$$

In an example embodiment, overlapping values can be obtained from RSRP and RS-SINR maps generated by planning/predicting tools or obtained through drive tests or call traces, as noted previously.

Example steps, blocks, modules, etc., to compute the CS (i.e., list of partner BBUs) for every BBU are illustrated in the flow diagrams of FIGS. 8A and 8B, and further described below.

Step 1: Generation of BBU Overlapping Matrix

In an example implementation, a BBU overlapping matrix $A^{BBU}$ may be generated as a symmetric square matrix with size equal to the number of BBUs in the hub (or the entire network or a portion thereof, referred to as a coordination area), of which elements are obtained by summing all overlapping values $A_{j,k}$ associated with all pair combinations between a cell #j connected to BBU #l and a cell #k connected to BBU #m. Accordingly, for a pair of BBUs comprising BBU #l and BBU #m, the cumulative overlapping value is defined as:

$$A_{l,m}^{BBU} = \sum_j \sum_k A_{j,k} \quad \text{Eqn. (3)}$$

Step 2: Generation of Sorted List of Candidate Partnerships

All possible pair combinations of BBUs (l,m), also known as candidate partnerships, may be sorted in descending order of the cumulative overlapping values $A_{l,m}^{BBU}$.

A sorted list L is thereby created, where the i-th element $L_i$ contains the candidate partnership composed of a pair of BBUs with the i-th strongest overlapping value. In one arrangement, candidate partnerships with zero overlapping are not included in the list. Where there are no zero overlapping partners, the cardinality of a candidate list (i.e., the total number of candidates) may be given as follows:

$$\text{CandList}(\ ) = [N(N-1)]/2 \quad \text{Eqn. (4)}$$

where N is the number of BBUs in the network or coordination area.

Step 3: Selection of BBU Partnerships

Starting from the beginning of the sorted list of candidate partnerships, the example CS generation process proceeds to select the partnerships if there is room in the CSs (i.e., the cardinality of the partnership set for any particular BBU is less than the allowed maximum number of partners). In an example implementation, this is effectuated by the example CS generation process upon executing the following sub-steps:

STEP 3.1: Creating one empty CS (list of partner BBUs) per BBU.

STEP 3.2: Selecting the first pair of BBUs (l,m) from the sorted list of candidate partnerships. In case it is not possible to select the first pair because the list is empty, go to STEP 4.

STEP 3.3: Determining if there is room to add one more BBU in the CS of BBU #l and another one in the CS of BBU #m.

In case there is room in both CSs, add BBU #l to the CS of BBU #m and vice versa. Remove the partnership from the sorted list of candidate partnerships, and continue with the next pair of BBUs in the sorted list (STEP 3.2).

Otherwise, move the partnership to a sorted list of discarded candidate partnerships and continue with the next pair of BBUs in the sorted list (STEP 3.2).

Step 4: Final Fine Tuning

As noted previously, this final step can be optionally followed in an example embodiment for the case in which one or more CSs have not been totally filled with any of the remaining candidate partner BBUs because their CSs are already full. This is accomplished by the example CS generation process upon executing the following sub-steps:

STEP 4.1: Saving the current CSs as the best CSs. Save the sum of the BBU overlapping values associated with all partnerships in the best CSs as the best total overlapping.

STEP 4.2: Selecting the first candidate partnership from the sorted list of previously discarded candidate partnerships computed at STEP 3. If both CSs are full, skip STEPS 4.3 to 4.7, and directly go to STEP 4.8.

STEP 4.3: Removing the partnership with lowest BBU overlapping from the full CS, as well as its reciprocal.

STEP 4.4: Mutually adding the BBUs to the CS of the other BBU.

STEP 4.5: Inspecting for the first partnership in the discarded list where the CSs of both BBUs are not full. If it is found, mutually add the BBUs to the CS of the other BBU and continue with STEP 4.6. Otherwise continuing with STEP 4.8.

STEP 4.6: If the current total overlapping is higher than the best total overlapping, saving the current CSs as the best CSs and save the current total overlapping as the best total overlapping, delete both partnerships from the sorted list of discarded candidate partnerships, and continue with STEP 4.7. Otherwise continue with STEP 4.8.

STEP 4.7: If the sorted list of discarded candidate partnerships is empty, the process is finished. Otherwise, repeat the procedure from STEP 4.2.

STEP 4.8: Deleting the first partnership from the sorted list of previously discarded candidate partnerships, and save the best CSs as the current CSs, as well as the best total overlapping as the current total overlapping. If the sorted list of discarded candidate partnerships is empty, the process is finished. Otherwise, the process flow is repeated from STEP 4.2.

Figure 8A:
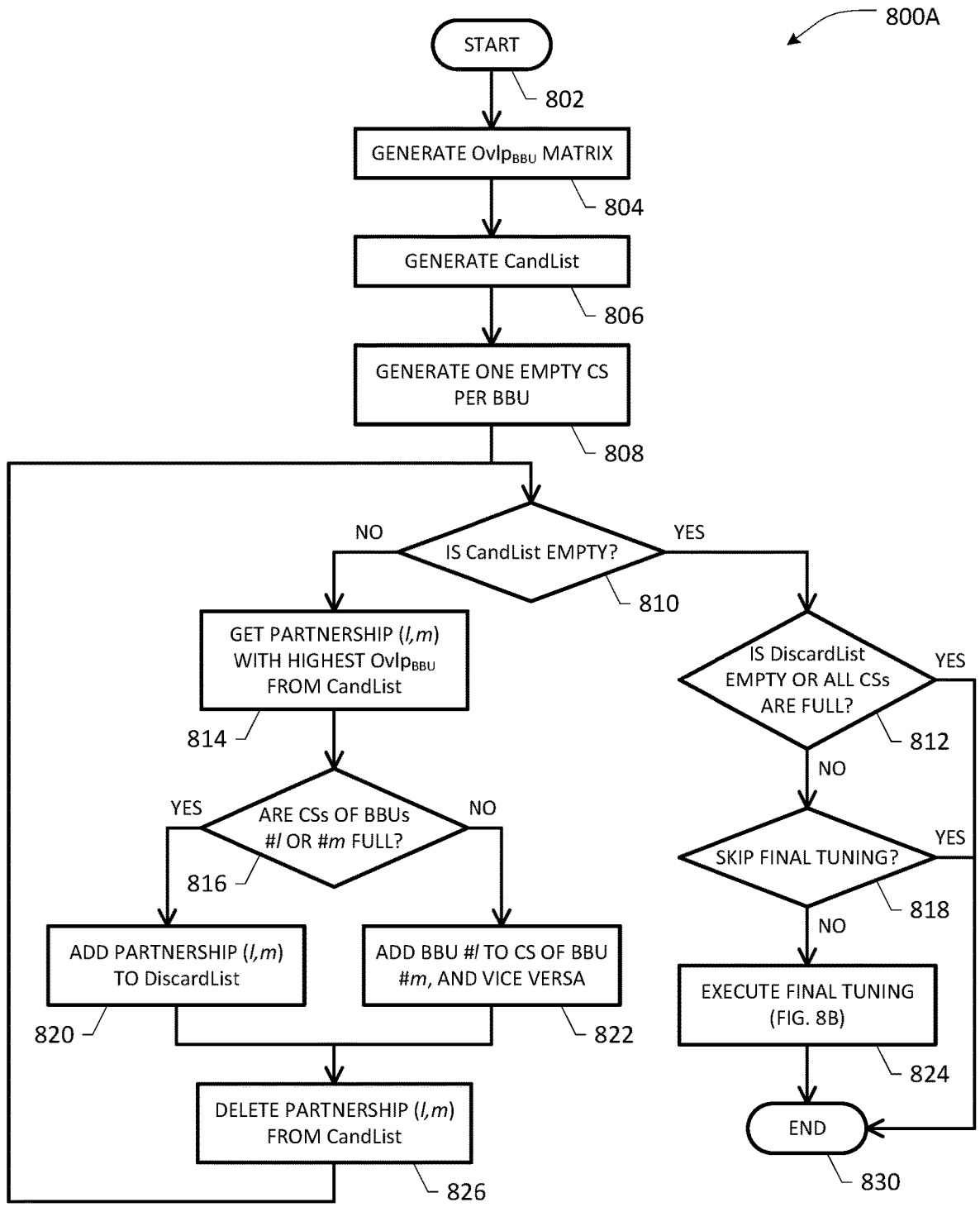
FIGS. 8A and 8B are flowcharts of various blocks, steps and/or acts that may be (re)combined in one or more arrangements, with or without additional flowcharts of the present disclosure, for generating BBU coordination sets (CS) in a fronthaul network portion for purposes of an example embodiment of the present patent disclosure.
Figure 8B:
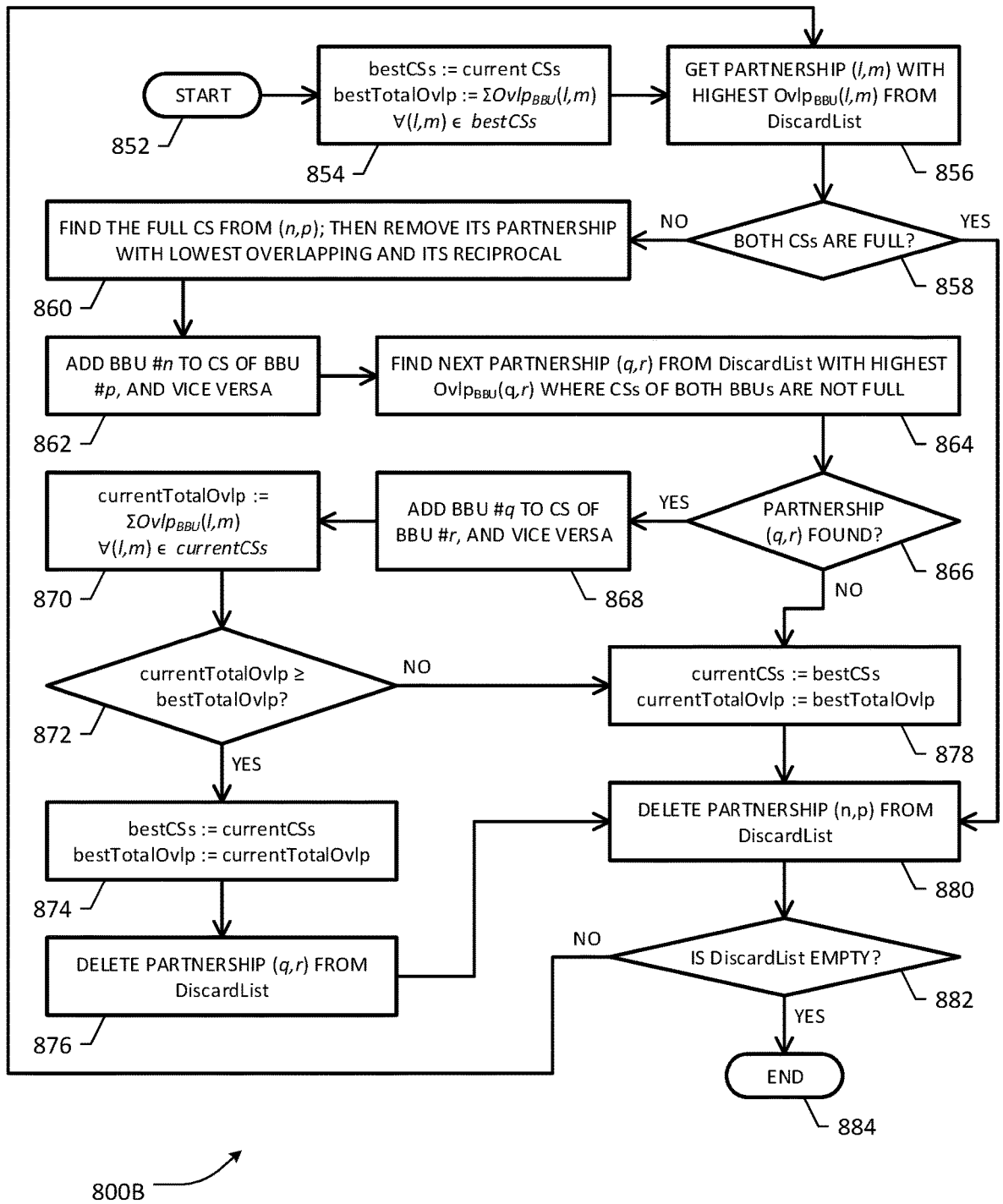

FIGS. 8A and 8B are flowcharts of various blocks, steps and/or acts that may be (re)combined in one or more arrangements, with or without additional flowcharts of the present disclosure, for generating BBU coordination sets in a fronthaul network portion for purposes of an example embodiment of the present patent disclosure. Skilled artisans will recognize that various process inputs and other constraints set forth in the foregoing sections are generally applicable with respect to the overall process flow shown in FIG. 8A, which in some exemplary embodiments may include an optional fine-tuning process 800B illustrated in detail in the flowchart of FIG. 8B. Example process 800A commences with generating a BBU overlapping matrix (referred to herein as $\text{Ovl}_{BBU}$), as set forth at blocks 802, 804, which is followed by generating a list of candidate partnerships therefrom (referred to herein as CandList), as set forth at block 806. A coordination set (CS) per BBU is initialized to an empty set (block 808) prior to executing an iterative process for sequentially populating it in accordance with the teachings herein.

A decision block 810 is operative to determine whether the candidate list is empty. If not, a BBU partnership pair (l,m) with the highest cumulative overlapping value ($\text{Ovl}_{BBU}$) is obtained from the candidate list (block 814). A further determination is made as to whether the CSs corresponding to either BBU #l or BBU #m is full (block 816). If not, BBU #l is added to the CS of BBU #m and vice versa (block 822). Otherwise, the partnership pair (l,m) is added to a list of discarded partnerships, referred to herein as DiscardList (block 820). Thereafter, the partnership pair (l,m) is removed from the candidate list (block 826). As illustrated in FIG. 8A, the process of partnership assignment may continue in an iterative process until the candidate list is empty (block 810). Upon determining that the candidate list is empty at block 810, a determination is made as to whether the list of discarded partnerships is empty or whether the CSs are full (block 812). In one example implementation, if either or both conditions are met, the process flow is terminated and the BBU partnerships as identified in the CSs may be provided as output (block 830). Otherwise, a further determination may be made as to whether a fine-tuning process is needed (block 818). If so, process 800B of FIG. 8B is executed, as set forth at block 824. Otherwise, the process flow is terminated with the resultant CSs being returned as before (block 830).

Example fine-tuning process 800B commences with defining best CSs as best found collection (bestCSs) of one CS per BBU, which may be initialized to a temporary collection of one CS per BBU (currentCSs), whereby a best total overlapping value may be determined by summing all overlapping values with respect to a BBU pair (l,m) for all (l,m) pairs belonging to the set of best CSs (blocks 852, 854). At block 856, a partnership (l,m) having the highest overlapping value is obtained from the DiscardList. At block 858, a determination is made as to whether both CSs are full. If so, the partnership (n,p) is deleted from the DiscardList (block 880). If at least one CS is not full, a full CS is obtained for a pair (n,p), and its partnership with lowest overlapping as well as its reciprocal is removed (block 860). Thereafter, BBU #n is added to the CS of BBU #p and vice versa (block 862). The DiscardList is examined for a next partnership (q,r) having the highest overlapping value where the CSs of both BBUs are not full (block 864). If such a partnership is obtained from the DiscardList, BBU #q is added to the CS of BBU #r and vice versa (block 868). The cumulative overlapping value of the updated current CSs is then obtained (block 870). A determination is made whether the current total overlapping value is greater than or equal to the best total overlapping value previously determined (block 872). If so, the bestCSs list is updated to the currentCSs list. Likewise, the best total overlapping value is updated to the current total overlapping value (block 874). Thereafter, partnership (q,r) is deleted from the DiscardList (block 876).

If the partnership (q,r) is not found (block 866), the currentCSs list is updated to the bestCSs list and the current total overlapping value is updated to the best total overlapping value (block 878). The same updating is also obtained if the determination at block 872 is that the current total overlapping value is not greater than or equal to the best total overlapping value. After the updating at block 878, the partnership (n, p) is deleted from the DiscardList as before (block 880). At block 882, a determination is made as to whether the DiscardList is empty. If so, the fine-tuning process is completed and an updated CS list is provided (block 884). Otherwise, the process flow returns to block 856 to continue fine-tuning with the next partnership (l,m) having the highest overlapping value, preferably in an iterative loop fashion, until the DiscardList is empty (block 882).

An example CS generation scenario in accordance with the foregoing teachings is set forth below, assuming a network of five BBUs and a maximum number of two partner BBUs per BBU.

By way of illustration, the following normalized BBU overlapping matrix for the set of five BBUs is obtained a result of the execution of STEP 1:

$$A^{BBU} = \begin{bmatrix} 1 & 0.2 & 0.3 & 0.4 & 0.5 \\ 0.2 & 1 & 0 & 0.3 & 0.4 \\ 0.3 & 0 & 1 & 0.2 & 0.3 \\ 0.4 & 0.3 & 0.2 & 1 & 0.2 \\ 0.5 & 0.4 & 0.3 & 0.2 & 1 \end{bmatrix} \quad \text{Eqn. (5)}$$

where $A_{l,m}^{BBU}$ represents the overlapping between BBU #l and BBU #m as previously described.

As part of STEP 2, a sorted list of candidate partnerships may be created as follows: CandList=[(1,5); (1,4); (2,5); (1,3); (2,4); (3,5); (1,2); (3,4); (4,5)], where the zero-overlapping partnership (2,3) is omitted.

Sequential/iterative selection of BBU partnerships may be executed as part of STEP 3, illustrated as follows:
First iteration
STEP 3.1: Creation of empty CSs (CSi is the CS of BBU #i):
CS1=[ ]
CS2=[ ]
CS3=[ ]
CS4=[ ]
CS5=[ ]
STEP 3.2: Selection of the first partnership in the candidate list (1,5).
STEP 3.3: CS1 and CS5 are empty, so there is room in both for one extra partner.
The updated CSs are:
CS1=[5]
CS2=[ ]
CS3=[ ]
CS4=[ ]
CS5=[1]
   The updated candidate list (i.e., after the removal of the allocated partnership (1,5)) is:
   Candidate List=[(1,4); (2,5); (1,3); (2,4); (3,5); (1,2); (3,4); (4,5)]
Second iteration:
   Next candidate is (1,4).
   CS1 and CS4 are not full yet.
   Updated CSs and candidate list are:
      CS1=[5,4]
      CS2=[ ]
      CS3=[ ]
      CS4=[1]
      CS5=[1]
      Candidate List=[(2,5); (1,3); (2,4); (3,5); (1,2); (3,4); (4,5)]
Third iteration:
   Next candidate is (2,5).
   CS2 and CS5 are not full yet.
   Updated CSs and candidate list are:
      CS1=[5,4]
      CS2=[5]
      CS3=[ ]
      CS4=[1]
      CS5=[1,2]
      Candidate List=[(1,3); (2,4); (3,5); (1,2); (3,4); (4,5)]
Fourth iteration:
   Next candidate is (1,3).
   CS1 is full, so (1,3) is added to the sorted discarded list:
      Discarded List=[(1,3)]
   Updated CSs and candidate list are:
      Candidate List=[(2,4); (3,5); (1,2); (3,4); (4,5)]
Fifth iteration:
   Next candidate is (2,4)
   CS2 and CS4 are not full yet.
   Updated CSs and candidate list are:
      CS1=[5,4]
      CS2=[5,4]
      CS3=[ ]
      CS4=[1,2]
      CS5=[1,2]
      Candidate List=[(3,5); (1,2); (3,4); (4,5)]

Sixth iteration:
  Next candidate is (3,5)
  CS5 is full, so (3,5) is added to the sorted discarded list:
    Discarded List=[(1,3); (3,5)]
Successive iterations: All CSs are already full, apart from CS3. This means that successive iterations will systematically move the pending elements of the candidate list to the discarded list, ending up with this situation:
  Discarded List=[(1,3); (3,5); (1,2); (3,4); (4,5)]
  Candidate List=[ ]
Final fine tuning (STEP 4):
STEP 4.1: Save current CSs and total overlapping as the best ones
Best CSs:
  CS1=[5,4]
  CS2=[5,4]
  CS3=[ ]
  CS4=[1,2]
  CS5=[1,2]
Best total overlapping=1.6
STEP 4.2: Select first discarded candidate partnership, which is (1,3).
STEP 4.3: Since CS1 is full, but CS2 is not, the process removes the partnership with lowest BBU overlapping from CS1, which is (1,4), as well as its reciprocal (4,1):
Current CSs:
  CS1=[5]
  CS2=[5,4]
  CS3=[ ]
  CS4=[2]
  CS5=[1,2]
Current total overlapping=1.2
STEP 4.4: The selected candidate partnership (1,3) is added to the current CSs, as well as the reciprocal (3,1).
Current CSs:
  CS1=[5,3]
  CS2=[5,4]
  CS3=[1]
  CS4=[2]
  CS5=[1,2]
Current total overlapping=1.5
Since current total overlapping is not higher than best total overlapping, the process continues with step 4.5:
STEP 4.5: The first partnership in the discarded list where the CSs of both BBUs are not full is (3,4), and it is added to the current CSs, as well as its reciprocal (4,3).
Current CSs:
  CS1=[5,3]
  CS2=[5,4]
  CS3=[1,4]
  CS4=[2,3]
  CS5=[1,2]
Current total overlapping=1.7
STEP 4.6: Since current total overlapping (1.7) is higher than the best total overlapping (1.6), the new best CSs is
Best CSs:
  CS1=[5,3]
  CS2=[5,4]
  CS3=[1,4]
  CS4=[2,3]
  CS5=[1,2]
Since there is no more room for extra partnerships in any of the CSs, the process flow finishes here, thereby determining the foregoing CSs for the five BBUs, wherein BBU #1 is partnered with BBUs #5 and #3; BBU #2 is partnered with BBUs #5 and #4; BBU #3 is partnered with BBUs #1 and #4; BBU #4 is partnered with BBUs #2 and #3; and finally, BBU #5 is partnered with BBUs #1 and #2.

Based on the foregoing, it will be appreciated that an example CS generation process of the present patent disclosure may be configured to find a set of optimal partner BBUs for every BBU to maximize the benefit of advanced E-RAN features, which may be conditioned on forcing the mutual selection of reciprocal partnerships and respecting the maximum number of partners per BBU. As previously noted, BBU partnerships do not have to be reciprocal, however. Skilled artisans will recognize that such a requirement may speed up convergence in the BBU pooling, which may or may not guarantee optimality in certain conditions. Furthermore, not all E-RAN features may require reciprocal BBU requirement. For instance, there may be a higher likelihood of reciprocity in CoMP than in CA. In a still further variation, it should be noted that since cells-to-BBU assignment is fixed (and known beforehand), capacity verifications (e.g., with respect to per-BBU port utilization, etc.) do not always have to be executed in an example CS/partnership generation process.

Moreover, one skilled in the art will appreciate that example embodiments specifically provide the following benefits. First, an example embodiment may be configured to pursue maximization of RF benefit associated with one or more E-RAN features by facilitating better E-RAN coordination among the optimal BBUs. Also, a fine-tuning process in an example embodiment may be configured to ensure better use of the available number of partners per BBU. An example embodiment is also particularly advantageous in that the process may be automated on a suitable computing platform, unlike manual solutions that not only consume the time and effort of network engineers but often also result in determinations that are suboptimal. Example embodiments, having a linear complexity proportional to the number of BBU pairs with non-zero overlapping, may be executed in a computationally efficient $O\{n\}$ process (i.e., the execution is very fast). Furthermore, example embodiments may be customized in different network implementations, e.g., to maximize the coordination benefit of any E-RAN feature, by means of using the most appropriate service level definitions to generate suitable overlapping traffic matrices accordingly.

Example embodiments are also particularly advantageous when practiced in combination with different architectural implementations, e.g., as follows:
  Flexible Cloud RAN deployment ensures good baseband coordination for strong network performance.
  Distributed, centralized, and virtual baseband (vRAN) architectures may be supported.
  Optimized 4G/5G interworking in vRAN.

Skilled artisans will further recognize that example CS generation embodiments set forth herein address and overcome the following deficiencies, without limitation, regarding current E-RAN implementations. For example, an existing solution based on fixed clusters of BBUs requires that BBUs connected to the same hub be grouped in clusters of 7. Inside every cluster, every BBU has a reciprocal relationship with the other 6 BBUs. However, this approach does not guarantee the selection of the best partners, and may not provide optimal performance. Actually, cells in the border of the clusters may experience lower probability to get coordinated with cells in other partner BBUs, while having high coverage overlapping with cells belonging to non-partner BBUs. In another existing solution, chained clusters of BBUs may be implemented where the maximum number of partner BBUs is 2 and partner-BBU relationships have a chain topology. A chained cluster may impose limitations on performance as geographical location and different overlap relations between the basebands may not give optimal performance. In another existing solution, daisy chain clusters of BBUs may be implemented where the E-RAN cluster is allowed to follow the end stations or UE devices. All such approaches fail to address the optimization of partner-BBU selection, however, in order to maximize the RF benefit of advanced to E-RAN features, such as CA and UL CoMP, which is addressed by the example embodiments herein.

Figure 6:
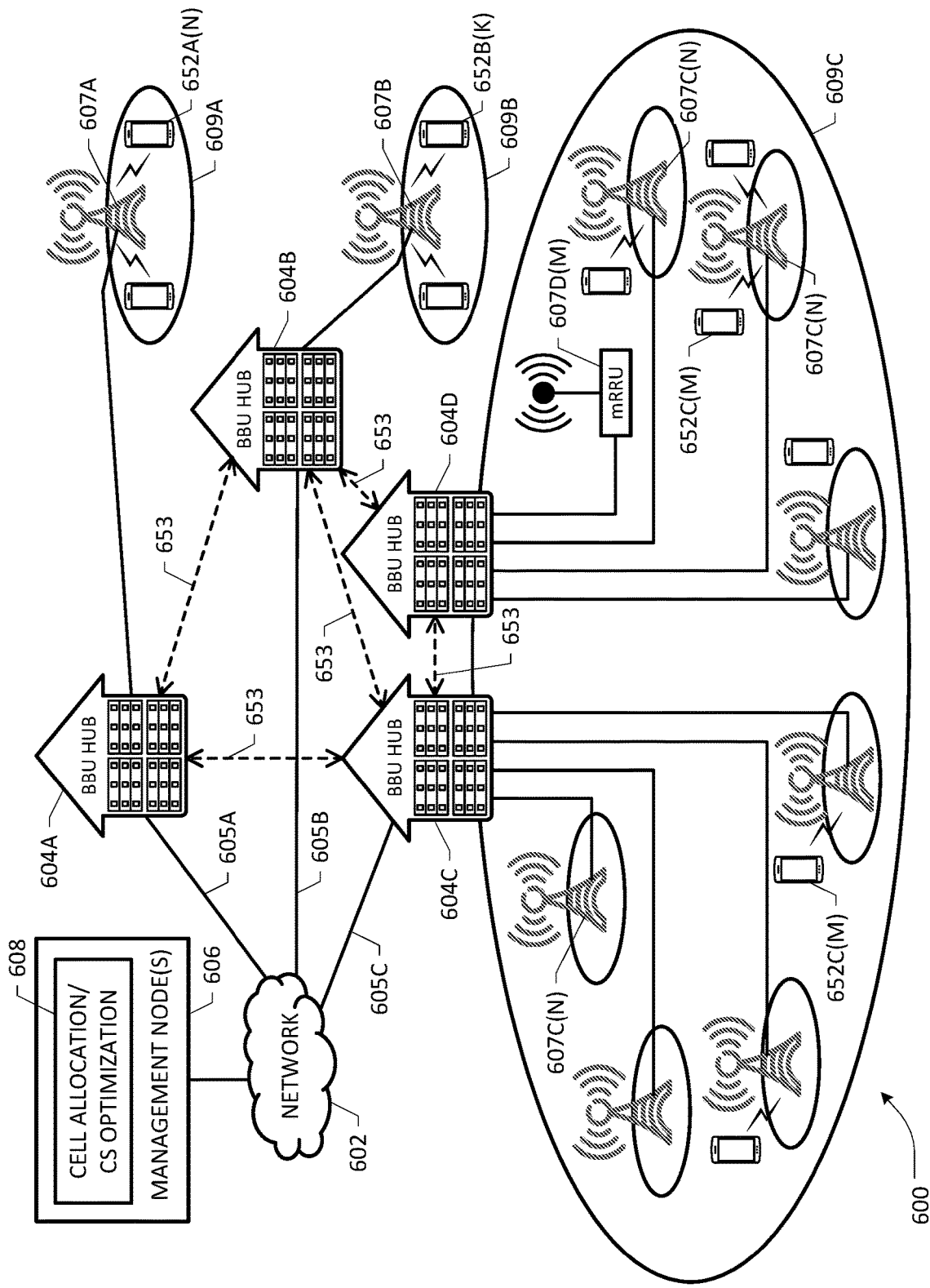
FIG. 6 depicts an example network wherein cell allocation and/or BBU coordination may be provided in association with one or more management nodes operatively coupled to the example network according to an embodiment of the present patent disclosure.

Turning to FIG. 6, depicted therein is an example network 600 where a cell allocation and/or a BBU coordination scheme may be provided in association with one or more management nodes operatively coupled to the example network 600 according to further embodiments of the present patent disclosure. By way of illustration, example network 600 may comprise a heterogeneous network environment wherein a plurality of cells, e.g., comprising one or more macro evolved Node B (macro-eNB) nodes, one or more micro-eNB nodes, one or more pico-eNB nodes, one or more femto-eNB nodes, or one or more home eNB (HeNB) nodes, may be geographically dispersed in different regions or clusters. Consistent with the teachings herein, the cells may be organized in one or more C-RAN portions, each being served by one or more BBU hubs or sites. As shown in this FIG., BBU hub 604A is operatively coupled to a node 607A serving an area 609A, BBU hub 604B is operatively coupled to a node 607B serving an area 609B, and BBU hubs 604C/D are operatively coupled to a myriad of nodes, e.g., macro nodes 607C(N) as well as small/micro nodes 607D(M), collectively serving an area 609C. Each BBU, which is coupled to a respective portion of cells via suitable IQ connections, may be coupled via backhaul networks/connections 605A-C to one or more core networks 602. One skilled in the art will recognize that the plurality of cells/nodes may be operative with a vast range of tethered and/or untethered UE stations or endpoints, as previously noted, which are exemplified by endpoints 652A(N), 652B(K), and 652C(M). As such, C-RANs, backhaul networks, as well as core networks 602 can be subsets of a single network provided by a single service provider or can be separate networks provided by different service providers at different hierarchical levels.

One or more management nodes 606 attached to core networks 602 can be configured to manage the operations of core networks 606 and/or the operations of the BBU sites and associated C-RANs. For purposes of an example embodiment of the present patent disclosure, management node(s) 606 can include but not limited to the following examples. Management node(s) 606 may be provided as an integral portion of core network(s) 602 or be provided outside of core network(s) 602, e.g., as a hosted service node by a third party. As technologies such as Software Defined Networking (SDN) and Network Function Virtualization (NFV) transform traditional networks into software programmable domains running on simplified, lower cost hardware, management node(s) 606 can be provided as data center nodes, and can further be present at different hierarchical layers within the network. For example, management node 606 can be located at a new entity, such as a Node C in a heterogeneous cloud radio access network (H-CRAN), at network edge nodes rather than in the centralized core, a mobility management entity (MME), a packet/service-gateway (P/S-GW), a node in a multi-service management plane (MSMP), etc. Also, management node(s) 606 can be cloud based and/or be part of a Self-Organizing Network or Self-Optimizing Network (SON) in some example embodiments.

One of the tools of management node(s) 606 may be configured as a CS generation module, a cell allocation and BBU optimization module, or a combination thereof, shown as a functional module 608, which may in turn be configured to operate with a network (re)configuration facility for effectuating static or dynamic resource allocation, assignment and provisioning with respect to any C-RAN portion of the network 600. Depending on the configured functionality, module 608 may execute one or more processes described in detail hereinabove to oversee the generation of BBU coordination sets and/or allocation of cells to BBUs and/hubs in an example embodiment as well as determining/assigning reciprocal partner BBUs with the objective of maximizing the coordination benefits that can be realized in an E-RAN. CS partnerships may be comprised of intra-hub as well as inter-hub partnerships, and may or may not necessarily be based on reciprocity. Depending on latency requirements, BBUs of heavily loaded BBU sites such as 604C/D may be partnered with lightly loaded BBUs at sites such as BBU hub 604A and/or 604B, as exemplified by one or more partnership communications 653.

Figure 9:
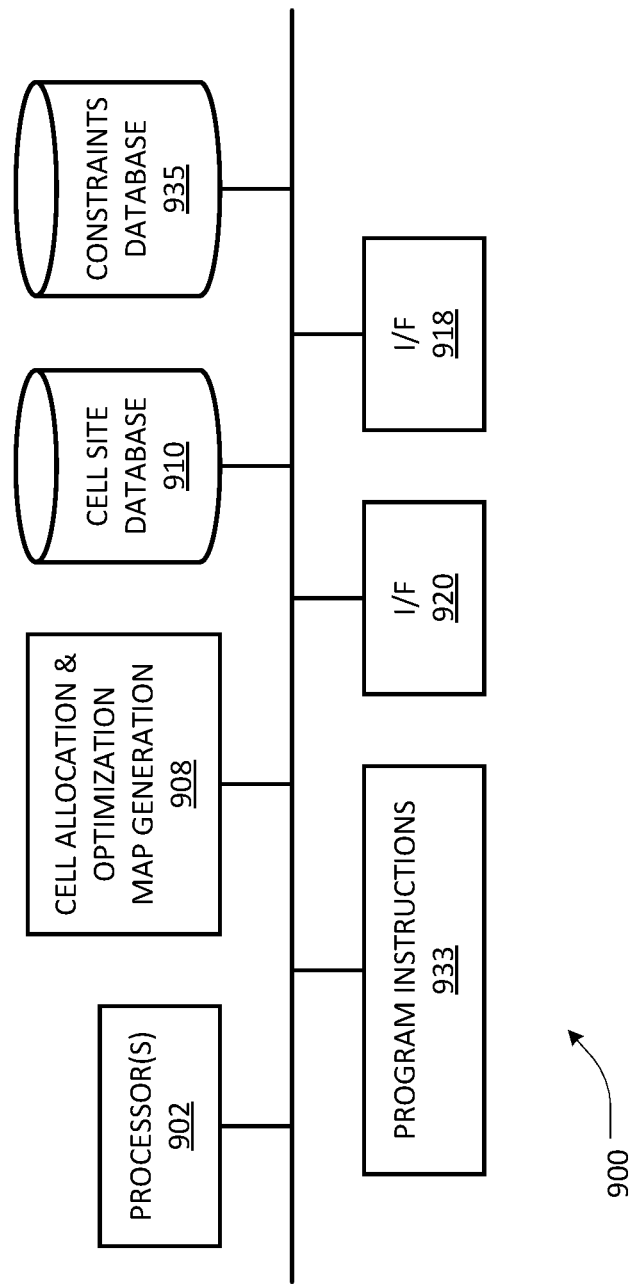
FIG. 9 is a block diagram of an apparatus, node, network element, or server according to an example embodiment of the present patent disclosure.

FIG. 9 depicts is a block diagram of a computer-implemented apparatus 900 that may be (re)configured and/or (re)arranged as a platform, server, node or element to effectuate an example management network node or element for cell allocation and BBU optimization according to an embodiment of the present patent disclosure. It should be appreciated that apparatus 900 may be implemented as a distributed data center platform or as a standalone node in some arrangements (e.g., node 400A of FIG. 4A in one embodiment). One or more processors 902 may be operatively coupled to various modules that may be implemented in persistent memory for executing suitable program instructions or code portions (e.g., code portion 933) with respect to effectuating various aspects of cell allocation and optimization by way of one or more modules as exemplified by cell allocation/optimization and cell assignment map generation module 908 and cell site database 910. A design constraints database 935 may also be provided, which may be dynamically/automatically updated, e.g., periodically or triggered pursuant to network/operator conditions and policies. Depending on the implementation, appropriate "upstream" interfaces (I/F) 918 and/or "downstream" I/Fs 920 may be provided for interfacing with external nodes, e.g., BSS nodes and/or other OSS components, BB hubs, management nodes, RRUs, etc. Accordingly, depending on the context, interfaces selected from interfaces 918, 920 may sometimes be referred to as a first interface, a second interface, and so on.

Figure 10:
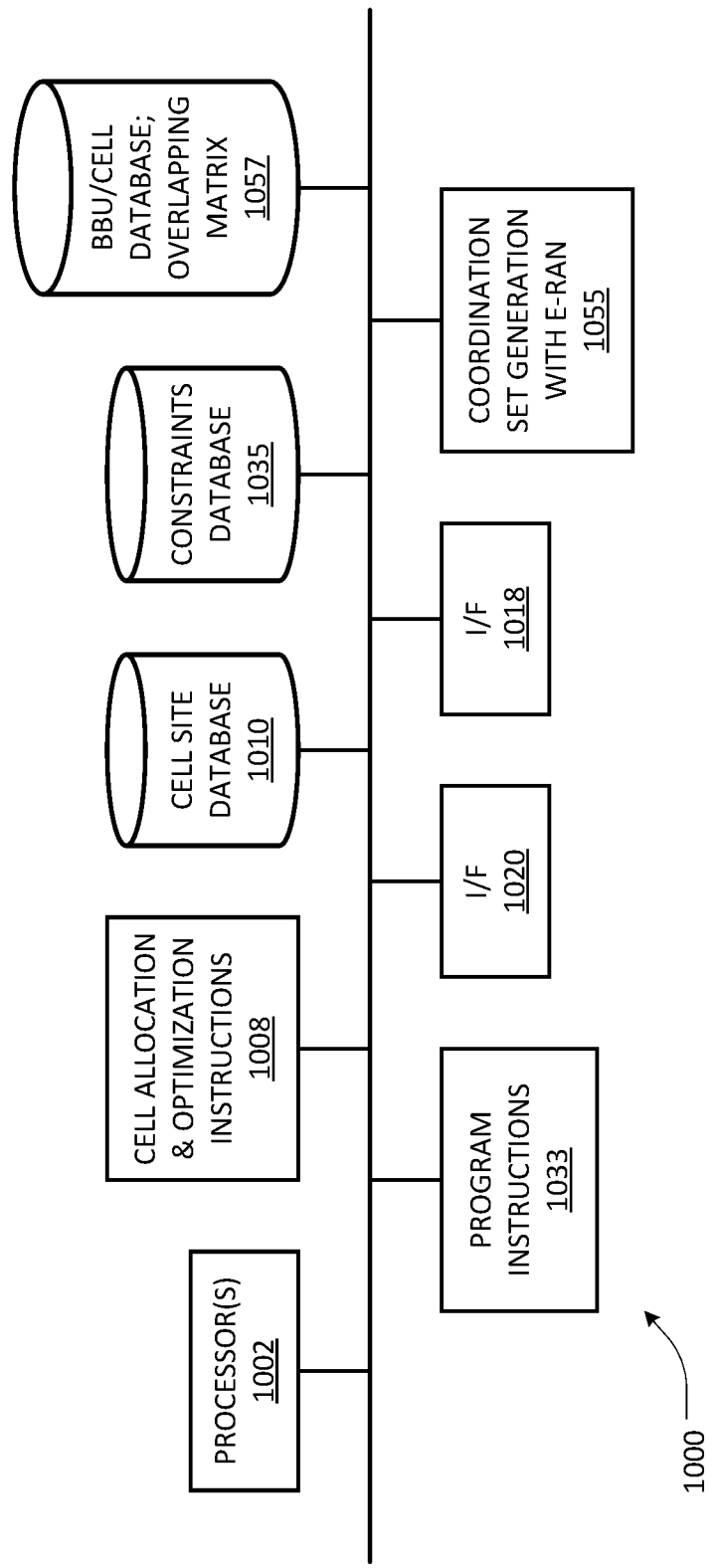
FIG. 10 is a block diagram of an apparatus, node, network element, or server according to another example embodiment of the present patent disclosure.

In similar fashion, a block diagram of a computer-implemented apparatus 1000 is illustrated in FIG. 10, which may be (re)configured and/or (re)arranged as a platform, server, node or element to effectuate an example management network node or element for CS generation and BBU partnership configuration according to an embodiment of the present patent disclosure. As with the platform 900, it should be appreciated that apparatus 1000 may be implemented as a distributed data center platform or as a standalone node in some arrangements (e.g., node 700A of FIG. 7A in one embodiment). One or more processors 1002 may be operatively coupled to various modules that may be implemented in persistent memory for executing suitable program instructions or code portions (e.g., code portion 1033) with respect to effectuating CS generation in association with one or more modules, e.g., CS generation module 1055, responsive to a BBU/cell database, partners/BBU database, overlapping matrix database, collectively, CS database 1057, as well as a cell site database 1010, for generating coordination sets and BBU partnership assignments according to an embodiment described herein. Optionally, a cell allocation module 1008 may also be integrated within the apparatus 1000 to provide optimization of both C-RAN and E-RAN features in a further embodiment. Accordingly, depending on the implementation, appropriate "upstream" interfaces (I/F) 1018 and/or "downstream" I/Fs 1020 may be provided for interfacing with external nodes, e.g., BSS nodes and/or other OSS components, BB hubs, management nodes, RRUs, etc., which may be referred to as a first interface, a second interface, and so on.

Figure 11:
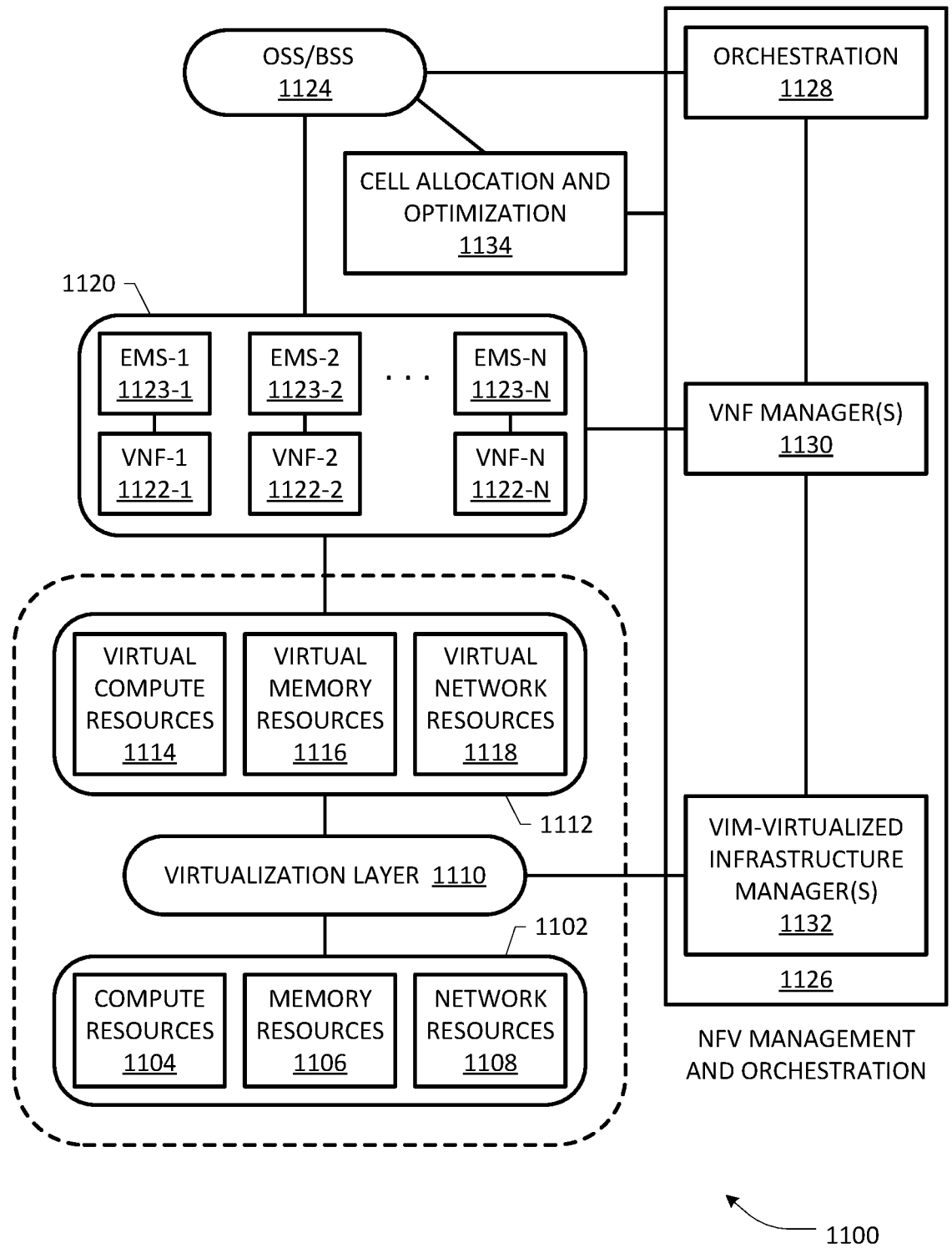
FIG. 11 depicts a Network Function Virtualization (NFV) architecture that may be implemented in conjunction with cell allocation and/or BBU CS generation according to an example embodiment of the present patent disclosure.

Turning to FIG. 11, depicted therein is a Network Function Virtualization (NFV) architecture 1100 that may be applied in conjunction with an OSS of the present invention configured to allocate cells or cell sites to BBUs and/or hubs as well as facilitate CS generation in a heterogeneous network environment such as the environment 600 set forth in FIG. 6. Various physical resources and services executing thereon within the network environment 600 may be provided as virtual appliances wherein the resources and service functions are virtualized into suitable virtual network functions (VNFs) via a virtualization layer 1110. Resources 1102 comprising compute resources 1104, memory resources 1106, and network infrastructure resources 1108 are virtualized into corresponding virtual resources 1112 wherein virtual compute resources 1114, virtual memory resources 1116 and virtual network resources 1118 are collectively operative to support a VNF layer 1120 including a plurality of VNFs 1122-1 to 1122-N, which may be managed by respective element management systems (EMS) 1123-1 to 1123-N. Virtualization layer 1110 (also sometimes referred to as virtual machine monitor (VMM) or "hypervisor") together with the physical resources 1102 and virtual resources 1112 may be referred to as NFV infrastructure (NFVI) of a network environment. Overall NFV management and orchestration functionality 1126 may be supported by one or more virtualized infrastructure managers (VIMs) 1132, one or more VNF managers 1130 and an orchestrator 1128, wherein VIM 1132 and VNF managers 1130 are interfaced with NFVI layer and VNF layer, respectively. An OSS platform 1124 (which may be integrated or co-located with a Business Support System (BSS) in some arrangements) is responsible for network-level functionalities such as network management, fault management, configuration management, service management, and subscriber management, etc. In one arrangement, various OSS components of the OSS platform 1124 may interface with VNF layer 1120 and NFV orchestration 1128 via suitable interfaces. In addition, OSS/BSS 1124 may be interfaced with a CS generation and cell allocation/optimization module 1134 for facilitating the CS generation, cell allocation and optimization within a network. Broadly, NFV orchestration 1128 involves generating, maintaining and tearing down of network services or service functions supported by corresponding VNFs, including creating end-to-end services over multiple VNFs in a network environment, (e.g., allocation of radio resources, BBU ports, etc.). Further, NFV orchestrator 1128 is also responsible for global resource management of NFVI resources, e.g., managing compute, storage and networking resources among multiple VIMs in the network.

Based on the foregoing, it should be appreciated that in the context of the present application, the CS generation and/or cell allocation/optimization functionality associated with an OSS platform such as OSS 1124 may also be configured in an example embodiment to access suitable OSS components that may be mapped to different hierarchical information layers based on how the virtualized resources are organized in accordance with NFVI. It should be appreciated that because the physical resources allocated to a VNF are considered to be elastic and the VNFs can run on multiple physical infrastructure network nodes, there is a loose coupling between the VNFs and the physical infrastructure hardware nodes they exist on, which allows greater scalability and dynamic configurability of a virtualized network environment. Consequently, the databases provided with different OSS components (based on the different hierarchical layers to which they are mapped) may need to be dynamically reconfigured as the underlying topologies change.

Figure 12A:
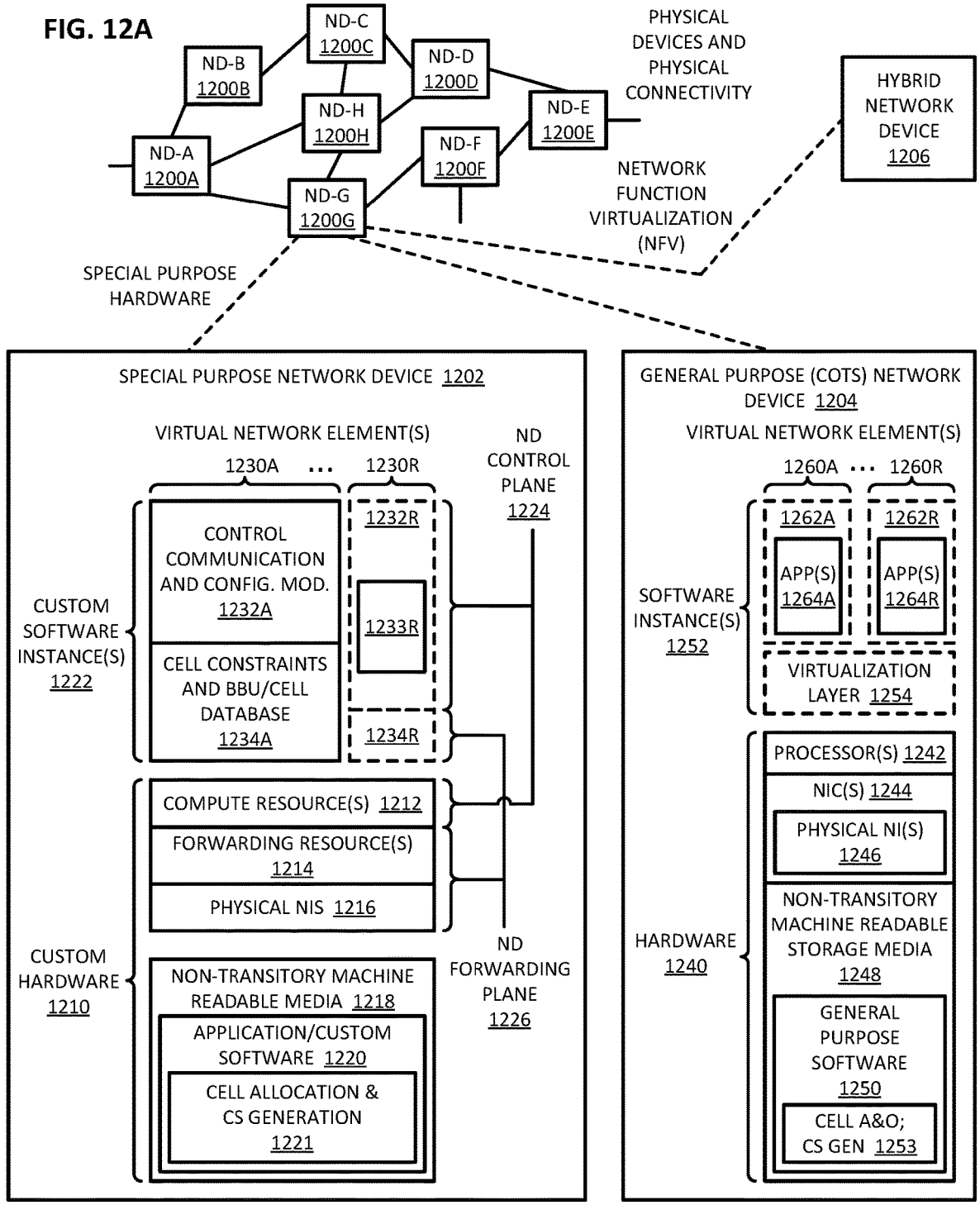
FIGS. 12A/12B illustrate connectivity between network devices (NDs) within an exemplary cloud-based service network, as well as three exemplary implementations of the NDs, for providing cell allocation and/or BBU CS generation according to some embodiments of the present invention.

FIGS. 12A/12B illustrate connectivity between network devices (NDs) within an exemplary network, as well as three exemplary implementations of the NDs, according to some embodiments of the invention wherein at least a portion of a heterogeneous hierarchical network environment and/or associated network nodes/components shown in some of the Figures previously discussed may be implemented in a virtualized environment. In particular, FIG. 12A shows NDs 1200A-H, which may be representative of various servers, database nodes, OSS components, external storage nodes, as well as other network elements of a network environment (e.g., management nodes, BBUs, (m)RRUs, and the like), wherein example connectivity is illustrated by way of lines between A-B, B-C, C-D, D-E, E-F, F-G, and A-G, as well as between H and each of A, C, D, and G. As noted elsewhere in the patent application, such NDs may be provided as physical devices, and the connectivity between these NDs can be wireless or wired (often referred to as a link). An additional line extending from NDs 1200A, E, and F illustrates that these NDs may act as ingress and egress nodes for the network (and thus, these NDs are sometimes referred to as edge NDs; while the other NDs may be called core NDs).

Two of the exemplary ND implementations in FIG. 12A are: (1) a special-purpose network device 1202 that uses custom application-specific integrated-circuits (ASICs) and a proprietary operating system (OS); and (2) a general purpose network device 1204 that uses common off-the-shelf (COTS) processors and a standard OS.

The special-purpose network device 1202 includes appropriate hardware 1210 (e.g., custom or application-specific hardware) comprising compute resource(s) 1212 (which typically include a set of one or more processors), forwarding resource(s) 1214 (which typically include one or more ASICs and/or network processors), and physical network interfaces (NIs) 1216 (sometimes called physical ports), as well as non-transitory machine readable storage media 1218 having stored therein suitable application-specific software or program instructions 1220 (e.g., CS generation and/or cell allocation/optimization 1221, etc.). A physical NI is a piece of hardware in an ND through which a network connection (e.g., wirelessly through a wireless network interface controller (WNIC) or through plugging in a cable to a physical port connected to a network interface controller (NIC)) is made, such as those shown by the connectivity between NDs 1200A-H. During operation, the application software 1220 may be executed by the hardware 1210 to instantiate a set of one or more application-specific or custom software instance(s) 1222. Each of the custom software instance(s) 1222, and that part of the hardware 1210 that executes that application software instance (be it hardware dedicated to that application software instance and/or time slices of hardware temporally shared by that application software instance with others of the application software instance(s) 1222), form a separate virtual network element 1230A-R.

Each of the virtual network element(s) (VNEs) 1230A-R includes a control communication and configuration module 1232A-R (sometimes referred to as a local control module or control communication module) and forwarding table(s) 1234A-R with respect to suitable application/service instances 1233A-R, such that a given virtual network element (e.g., 1230A) includes the control communication and configuration module (e.g., 1232A), a set of one or more forwarding table(s) (e.g., 1234A), and that portion of the application hardware 1210 that executes the virtual network element (e.g., 1230A) for supporting the application instance 1233A (e.g., collecting RAN data, performing CS generation and/or cell allocation/optimization, and the like in relation to a CS generation and/or cell allocation/optimization subsystem virtualization).

Software 1220 can include code such as CS generation, cell allocation and optimization module 1221, which when executed by networking hardware 1210, causes the special-purpose network device 1202 to perform operations of one or more embodiments of the present invention as part of networking software instances 1222.

In an example implementation, the special-purpose network device 1202 is often physically and/or logically considered to include: (1) a ND control plane 1224 (sometimes referred to as a control plane) comprising the compute resource(s) 1212 that execute the control communication and configuration module(s) 1232A-R; and (2) a ND forwarding plane 1226 (sometimes referred to as a forwarding plane, a data plane, or a bearer plane) comprising the forwarding resource(s) 1214 that utilize the forwarding or destination table(s) 1234A-R and the physical NIs 1216. By way of example, where the ND is a virtual OSS node, the ND control plane 1224 (the compute resource(s) 1212 executing the control communication and configuration module(s) 1232A-R) is typically responsible for participating in determining the allocation and optimization of cells to BBUs/hubs. Likewise, ND forwarding plane 1226 is responsible for receiving that data on the physical NIs 1216 (e.g., similar to I/Fs in FIGS. 8 and 9) and forwarding that data out the appropriate ones of the physical NIs 1216 based on the forwarding information.

Figure 12B:
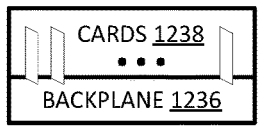

FIG. 12B illustrates an exemplary way to implement the special-purpose network device 1202 according to some embodiments of the invention, wherein an example special-purpose network device includes one or more cards 1238 (typically hot pluggable) coupled to an interconnect mechanism. While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway), etc.). By way of example, a service card may be used to terminate IPsec tunnels and execute the attendant authentication and encryption algorithms. These cards may be coupled together through one or more interconnect mechanisms illustrated as backplane 1236 (e.g., a first full mesh coupling the line cards and a second full mesh coupling all of the cards).

Returning to FIG. 12A, an example embodiment of the general purpose network device 1204 includes hardware 1240 comprising a set of one or more processor(s) 1242 (which are often COTS processors) and network interface controller(s) 1244 (NICs; also known as network interface cards) (which include physical NIs 1246), as well as non-transitory machine readable storage media 1248 having stored therein software 1250. During operation, the processor(s) 1242 execute the software 1250 to instantiate one or more sets of one or more applications 1264A-R with respect to facilitating OSS functionalities. While one embodiment does not implement virtualization, alternative embodiments may use different forms of virtualization represented by a virtualization layer 1254 and software containers 1262A-R. For example, one such alternative embodiment implements operating system-level virtualization, in which case the virtualization layer 1254 represents the kernel of an operating system (or a shim executing on a base operating system) that allows for the creation of multiple software containers 1262A-R that may each be used to execute one of the sets of applications 1264A-R. In this embodiment, the multiple software containers 1362A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1254 represents a hypervisor (sometimes referred to as a virtual machine monitor (VMM) as noted elsewhere in the present patent application) or a hypervisor executing on top of a host operating system; and (2) the software containers 1262A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1264A-R, as well as the virtualization layer 1254 and software containers 1262A-R if implemented are collectively referred to as software instance(s) 1252. Each set of applications 1264A-R, corresponding software container 1262A-R if implemented, and that part of the hardware 1240 that executes them (be it hardware dedicated to that execution and/or time slices of hardware temporally shared by software containers 1262A-R), forms a separate virtual network element(s) 1260A-R.

The virtual network element(s) 1260A-R perform similar functionality to the virtual network element(s) 1230A-R e.g., similar to the control communication and configuration module(s) 1232A and forwarding table(s) 1234A (this virtualization of the hardware 1240 is sometimes referred to as Network Function Virtualization (NFV) architecture, as set forth previously. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 1262A-R differently. For example, while embodiments of the invention may be practiced in an arrangement wherein each software container 1262A-R corresponds to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1262A-R to VNEs also apply to embodiments where such a finer level of granularity is used.

In certain embodiments, the virtualization layer 1254 may include a virtual switch that provides similar forwarding services as a physical Ethernet switch. Specifically, this virtual switch forwards traffic between software containers 1262A-R and the NIC(s) 1244, as well as optionally between the software containers 1262A-R. In addition, this virtual switch may enforce network isolation between the VNEs 1260A-R that by policy are not permitted to communicate with each other (e.g., by honoring virtual local area networks (VLANs)).

Software 1250 can include code such as CS generation and/or cell allocation/optimization 1253, which when executed by networking hardware 1240, causes the general-purpose network device 1204 to perform operations of one or more embodiments of the present invention as part of software instances 1253.

The third exemplary ND implementation in FIG. 12A is a hybrid network device 1206, which may include both custom ASICs/proprietary OS and COTS processors/standard OS in a single ND or a single card within an ND. In certain embodiments of such a hybrid network device, a platform VM (i.e., a VM that implements the functionality of the special-purpose network device 1202) could provide for para-virtualization to the application-specific hardware present in the hybrid network device 1206 for effectuating one or more components, blocks, modules, and functionalities of an OSS platform.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical NIs (e.g., 1216, 1246).

Accordingly, various hardware and software blocks configured for effectuating an example management node including those associated with CS generation and/or cell allocation/optimization functionality may be embodied in NDs, NEs, NFs, VNE/VNF/VND, virtual appliances, virtual machines, and the like, as well as electronic devices and machine-readable media, which may be configured as any of the apparatuses described herein. One skilled in the art will therefore recognize that various apparatuses and systems with respect to the foregoing embodiments, as well as the underlying network infrastructures set forth above may be architected in a virtualized environment according to a suitable NFV architecture in additional or alternative embodiments of the present patent disclosure as noted above.

In view of the foregoing, it will be appreciated that one or more embodiments of the present patent disclosure may be implemented in a virtualized heterogeneous network environment including a C-RAN architecture, wherein the network virtualization contains a group of virtual nodes and virtual links. Further, multiple virtual networks can coexist on the same physical substrate. Deploying the virtual networks for the heterogeneous network architecture promotes flexible control, low cost, efficient resource usage, and diversified applications, all of which may be particularly leveraged by an example embodiment of the present patent disclosure. In the context of BBU pooling, it will be realized that network virtualization separates not only data storage but also applications, operating systems and management control. BBU pools may be configured to operate over respective sets of hardware platforms including CPU, memory, NICs and so on, as described above. The virtualization may be implemented via suitable operating systems (e.g., as host or guest machines), wherein the functions of a base station are realized as software instances, which may be referred to as Virtual Base Stations (VBSs) or Virtual BBUs. Within a VBS/VBBU pool, several virtual operators may share a common network environment, allowing virtual BBU partnerships for E-RAN features such as CA and CoMP, as well as allocating cells to virtual BBUs in accordance with the teachings herein.

Accordingly, at least a portion of an example network architecture disclosed herein may be virtualized as set forth above and architected in a cloud-computing environment comprising a shared pool of configurable virtual resources. Various pieces of hardware/software associated with hub selection, cell allocation to selected hub(s), cell allocation to BBU(s) in selected hub(s), CS generation and BBU assignment, and the like, as well as BBUs and RRUs, may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. In a telecommunications network including a fronthaul network portion comprising a plurality of cells and one or more baseband unit (BBU) hubs, each BBU hub comprising at least a BBU, a method of configuring network connectivity between the plurality of cells and the one or more BBU hubs, the method comprising:
providing a plurality of input variables and design constraints;
selecting a BBU hub from the group of BBU hubs responsive to a determination with respect to at least one or more input variables and design constraints;
allocating at least a portion of the cells to the selected BBU hub until the selected BBU hub is determined to be full with respect to a capacity parameter;
assigning the allocated cells to individual BBUs sequentially within the selected BBU hub;
repeating, in a sequential iterative process, the acts of selecting BBU hubs, allocating cells to each of the selected BBU hubs and sequentially assigning the allocated cells to individual BBUs within each selected BBU hub, respectively, until there remain no unallocated cells;
obtaining a cell allocation map identifying allocations of the plurality of cells with respect to the selected BBU hubs and the individual BBUs therein; and
responsive to the cell allocation map, configuring connections between the plurality of cells and the selected BBU hubs to facilitate optimization of one or more key performance indicators in the fronthaul network portion with respect to at least one of radio frequency (RF)

capacity, network throughput, spectral efficiency, hardware optimization including per-BBU port utilization, application coverage, inter-cell interference, and user media experience.

2. The method as recited in claim 1, wherein the plurality of cells comprise at least one of a macrocell, a small cell, a picocell, and a femtocell, and further wherein the connections between the plurality of cells and the selected BBU hubs are effectuated using at least one of Common Public Radio Interface (CPRI) protocol, Open Base Station Architecture Initiative (OBSAI) protocol and Open Radio Initiative (ORI) protocol.

3. The method as recited in claim 2, wherein the plurality of input variables and design constraints comprise at least one of: (i) a list identifying the plurality of cells including physical location and port information; (ii) a list identifying the group of BBU hubs including physical location and port information; (iii) a list of preassigned cells indicating a initial mapping of at least a subplurality of the cells to one or more BBU hubs and respective BBUs therein; (iv) an overlapping traffic matrix defining mutual service level overlapping between any pair of cells (cell #j and cell #k); (v) a set of hardware constraints comprising at least one of a number of BBU hubs, a number of BBUs per hub, a number of ports per BBU, a number of cells operable per BBU, latency requirements, and a maximum distance allowed between a cell and each BBU hub; and (vi) an affinity matrix defining a degree of affinity or coordination between any pair of cells (cell #j and cell #k).

4. The method as recited in claim 3, wherein in selecting a BBU hub from the group of BBU hubs, a higher priority is assigned to BBU hubs having preassigned cells than BBU hubs having no preassigned cells.

5. The method as recited in claim 4, further comprising: if there are more than one BBU hub having at least one preassigned cell, selecting a BBU hub from such subset of the BBU hubs having at least one preassigned cell based on prioritizing a BBU hub having a highest number of gaps, determined as a minimum value between an available number of cells and an available number of ports supported by the BBU hub.

6. The method as recited in claim 5, wherein the overlapping matrix defining mutual service level overlapping between any pair of cells (cell #j and cell #k) is obtained as a symmetric square matrix according to:

$$A_{j,k} = A_{k,j} = (A_{j,k}^u)^2 + (A_{k,j}^u)^2$$

where $A^u$ is a unidirectional overlapping matrix with respect to the pair of cells (cell #j and cell #k defining a first ratio of traffic in which cells #j and #k have a predetermined service level, compared to a traffic in which cell #j has a predetermined service level, and where $A^u$ is non-symmetric such that $A_{j,k}^u \neq A_{k,j}^u$.

7. The method as recited in claim 6, wherein a service level is determined based on at least one of a Reference Signal Received Power (RSRP) value over a first threshold, a Reference Signal Received Quality (RSRQ) value over a second threshold, and a Reference Signal to Interference-plus-Noise Ratio (RS-SINR) value over a third threshold.

8. The method as recited in claim 3, wherein the affinity matrix defining a degree of affinity or coordination between any pair of cells (cell #j and cell #k) is determined based on following relationships: (i) an affinity value of "0" to indicate that the pair of cells (cell #j and cell #k) are required to belong to different BBUs; (ii) an affinity value of "1" to indicate that the pair of cells (cell #j and cell #k) are permitted but not required to belong to a same BBU; and (iii) an affinity value of "2" to indicate that the pair of cells (cell #j and cell #k) are required to belong to a same BBU.

9. The method as recited in claim 8, wherein the allocating of at least a portion of the cells to the selected BBU hub comprises:
identifying any cells of the at least a portion of the cells that are preassigned to the selected BBU hub;
allocating the preassigned cells to the selected BBU hub on a higher priority basis;
if the selected BBU hub is not full, creating a list of candidate cells that can be connected the selected BBU, the list of candidate cells identifying candidate cells according to at least one of (i) a cost function based on each candidate cell's distance to the selected BBU hub; and (ii) a degree of overlapping between a candidate cell and one or more cells already assigned to the selected BBU hub;
allocating a candidate cell to the selected BBU hub responsive to a determination based on at least one of (i) the candidate cell's cost function relative to the selected BBU hub; and (ii) the degree of overlapping between the candidate cell and one or more cells already assigned to the selected BBU hub; and
repeating allocation of candidate cells to the selected BBU hub until the selected BBU hub is full.

10. The method as recited in claim 9, wherein the assigning of allocated cells to one or more BBUs sequentially within the selected BBU hub comprises:
identifying any cells of the at least a portion of the cells that are preassigned to any particular BBUs of the selected BBU hub;
allocating the preassigned cells to the respective particular BBUs of the selected BBU hub;
allocating an unallocated cell to a BBU having a preassigned cell that has a highest degree of overlapping with the unallocated cell; and
repeating allocation of remaining unallocated cells to the BBUs having preassigned cells until each such BBU is full.

11. The method as recited in claim 10, wherein assigning of at least a portion of the cells to one or more BBUs sequentially within the selected BBU hub further comprises:
for any remaining unallocated cells, allocating such remaining unallocated cells to BBUs having no preassigned cells one-by-one, taking into account at least one of (i) any overlapping between a candidate cell to be allocated and cells already assigned to the BBU; and (ii) a port-to-cell gap associated with the BBU.

12. An apparatus configured to facilitate network connectivity in a fronthaul network portion comprising a plurality of cells and one or more baseband unit (BBU) hubs, each BBU hub comprising at least a BBU, the apparatus comprising:
one or more processors; and
one or more persistent memory modules having program instructions stored thereon which, when executed by the one or more processors, perform a method according to claim 1.

13. The apparatus as recited in claim 12, wherein the one or more processors and the one or more persistent memory modules are configured as at least part of one of a data center node, a network management node, and an Operations Support System/Business Support System (OSS/BSS) node.

14. The apparatus as recited in claim 13, wherein at least one of the data center node, the network management node, and the OSS/BSS node is configured as one or more virtual appliances.

15. A system configured to facilitate network connectivity in a fronthaul network portion comprising a plurality of cells and one or more baseband unit (BBU) hubs, each BBU hub comprising at least a BBU, the system comprising:
  one or more processors; and
  one or more persistent memory modules having program instructions stored thereon which, when executed by the one or more processors, perform following acts in association with one or more modules:
    obtaining a plurality of input variables and design constraints;
    selecting a BBU hub from the group of BBU hubs responsive to a determination with respect to at least one or more input variables and design constraints;
    allocating at least a portion of the cells to the selected BBU hub until the selected BBU hub is determined to be full with respect to a capacity parameter;
    assigning the allocated cells to individual BBUs sequentially within the selected BBU hub;
    repeating, in a sequential iterative process, the acts of selecting BBU hubs, allocating cells to each of the selected BBU hubs and sequentially assigning the allocated cells to individual BBUs within each selected BBU hub, respectively, until there remain no unallocated cells;
    obtaining a cell allocation map identifying allocations of the plurality of cells with respect to the selected BBU hubs and the individual BBUs therein; and
    responsive to the cell allocation map, configuring connections between the plurality of cells and the selected BBU hubs to facilitate optimization of one or more key performance indicators in the fronthaul network portion with respect to at least one of radio frequency (RF) capacity, network throughput, spectral efficiency, hardware optimization including per-BBU port utilization, application coverage, inter-cell interference, and user media experience.

* * * * *